(12) United States Patent
Oteri et al.

(10) Patent No.: US 12,712,683 B2
(45) Date of Patent: Aug. 18, 2026

(54) FREQUENCY HOPPED PRSS FOR LOCATION ESTIMATION OF REDUCED CAPACITY DEVICES

(71) Applicant: Apple Inc., Cupertino, CA (US)

(72) Inventors: Oghenekome Oteri, San Diego, CA (US); Wei Zeng, San Diego, CA (US); Dawei Zhang, Saratoga, CA (US); Hong He, Cupertino, CA (US); Seyed Ali Akbar Fakoorian, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 581 days.

(21) Appl. No.: 17/885,424

(22) Filed: Aug. 10, 2022

(65) Prior Publication Data

US 2024/0056242 A1 Feb. 15, 2024

(51) Int. Cl.
*H04L 5/00* (2006.01)
*H04L 1/08* (2006.01)

(52) U.S. Cl.
CPC .............. *H04L 5/0012* (2013.01); *H04L 1/08* (2013.01); *H04L 5/0051* (2013.01)

(58) Field of Classification Search
CPC ....... H04L 5/0015; H04L 5/0051; H04L 1/08; H04L 5/0048; H04W 24/10
See application file for complete search history.

(56) References Cited

U.S. PATENT DOCUMENTS 12,088,519 B2 9/2024 Duan
2016/0248563 A1 8/2016 Behravan
2019/0178976 A1* 6/2019 Xiong .................. H04W 64/00
2019/0297489 A1 9/2019 Lei
2020/0028648 A1 1/2020 Akkarakaran
2021/0377089 A1 12/2021 Gaal
2022/0045811 A1* 2/2022 Lin ...................... H04L 5/0041
2022/0109466 A1 4/2022 Manolakos
2022/0397632 A1 12/2022 Duan
(Continued)

FOREIGN PATENT DOCUMENTS

WO WO-2024030175 A1 * 2/2024 ........... G01S 5/0205

OTHER PUBLICATIONS

International Search Report for PCT/US2023/029818; Nov. 21, 2023.

(Continued)

*Primary Examiner* — Shukri Taha

(74) *Attorney, Agent, or Firm* — Kowert, Hood, Munyon, Rankin & Goetzel, P.C.

(57) ABSTRACT

Apparatuses, systems, and methods for positioning reference signals (PRSs) for reduced capacity devices, e.g., in 5G NR systems and beyond. A UE may be configured to receive, from a network (e.g., from a base station and/or an LMF), a first repetition of a frequency hopping (FH) PRS in a first frequency bandwidth. The first frequency bandwidth may be a subset of a full bandwidth used for full bandwidth PRSs. The UE may be configured to switch to a second frequency bandwidth that may be overlapped with the first frequency bandwidth. The second frequency bandwidth may be a subset of the full bandwidth. Additionally, the UE may be configured to receive a second repetition of the FH PRS in the second frequency bandwidth.

23 Claims, 17 Drawing Sheets

(56) References Cited

U.S. PATENT DOCUMENTS

| | | | |
|---|---|---|---|
| 2023/0003832 | A1 | 1/2023 | Watkins |
| 2023/0011318 | A1 | 1/2023 | Wang |
| 2023/0063450 | A1 | 3/2023 | Fakoorian |
| 2023/0144227 | A1 | 5/2023 | Manolakos |
| 2023/0370230 | A1 | 11/2023 | Duan |
| 2023/0379119 | A1 | 11/2023 | Dai |
| 2024/0031101 | A1 | 1/2024 | Bao |
| 2024/0056242 | A1* | 2/2024 | Oteri ..................... H04L 5/0051 |
| 2024/0104202 | A1 | 3/2024 | Duan |
| 2024/0179583 | A1 | 5/2024 | Rao |
| 2024/0284389 | A1 | 8/2024 | Zheng |
| 2024/0292253 | A1 | 8/2024 | Hong |
| 2024/0410970 | A1 | 12/2024 | Manolakos |
| 2025/0008537 | A1 | 1/2025 | Sahin |
| 2025/0048157 | A1 | 2/2025 | Manolakos |
| 2025/0056474 | A1 | 2/2025 | Hofmann |
| 2025/0071719 | A1 | 2/2025 | Tao |
| 2025/0164598 | A1 | 5/2025 | Ramachandran |
| 2025/0226942 | A1 | 7/2025 | Cabrera Mercader |

OTHER PUBLICATIONS

Qualcomm Inc "Positioning for Reduced Capabilities UEs"; 3GPP TSG RAN WG1 #109-e R1-2205042; May 9, 2022.

Office Action for U.S. Appl. No. 17/885,441; Mar. 6, 2025.

Pin et al. "LTE Uplink TOA Opportunistic Measurement Based on DM-RS" IEEE, Apr. 24, 2019.

* cited by examiner

FREQUENCY HOPPED PRSS FOR LOCATION ESTIMATION OF REDUCED CAPACITY DEVICES

FIELD

The invention relates to wireless communications, and more particularly to apparatuses, systems, and methods for positioning reference signals (PRSs) for reduced capacity devices, e.g., in cellular systems, such as LTE systems, 5G NR systems, and beyond.

DESCRIPTION OF THE RELATED ART

Wireless communication systems are rapidly growing in usage. In recent years, wireless devices such as smart phones, wearable devices or accessory devices), and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for positioning reference signals (PRSs) for reduced capacity devices, e.g., in 5G NR systems and beyond.

For example, in some embodiments, a UE may be configured to report, to a network (e.g., to a base station or an LMF) one or more capabilities associated with a positioning procedure for location estimation, e.g., such as a radio frequency retuning time, a parameter indicating a number of bandwidth switches needed by the UE to cover an effective bandwidth and a duration of downlink positioning reference signal symbols, N, that the UE can process in an indicated time period, T, and/or a processing bandwidth, among other parameters. The UE may be configured to receive, from the network and based on the one or more capabilities, a reference signal configuration for the positioning procedure. The reference signal configuration may support coherent stitching (e.g., frequency hopping) with tone-overlap. The reference signal configuration may, to support coherent stitching with tone-overlap, include additional repetitions that enable mapping over a bandwidth and/or a scaling factor that may be based, at least in part, on an actual bandwidth, a desired positioning measurement bandwidth, and an overlap indicated by the UE. The UE may be configured to perform reference signal measurements based on the reference signal configuration.

As another example, in some embodiments, a UE may be configured to receive, from a network (e.g., from a base station and/or an LMF), a first repetition of a frequency hopping (FH) PRS in a first frequency bandwidth. The first frequency bandwidth may be a subset of a full bandwidth used for full bandwidth PRSs. The UE may be configured to switch to a second frequency bandwidth that may be overlapped with the first frequency bandwidth. The second frequency bandwidth may be a subset of the full bandwidth. Additionally, the UE may be configured to receive a second repetition of the FH PRS in the second frequency bandwidth.

As a further example, in some embodiments, a UE may be configured to may receive, from a network (e.g., from a base station and/or an LMF) a reference signal configuration for the positioning procedure, e.g., based on one or more capabilities reported by the UE. The reference signal configuration may support coherent stitching (e.g., frequency hopping) with tone-overlap. Additionally, the UE may be configured to receive downlink positioning reference signals and mute at least a portion of downlink positioning reference signal resources. A phase discontinuity may be generated by muting at least the portion of PRS resources and transmission of the PRS resources may continue without regard to the phase discontinuity or transmission of the PRS resources may be shifted to account for the phase discontinuity such that a PRS transmission immediately after the muted portion of PRS resources may be shifted to remain in phase with a transmission that occurred immediately prior to the muted portion of the PRS resources.

As an additional example, in some embodiments, a UE may report, to a network (e.g., to a base station or an LMF) one or more capabilities associated with a positioning procedure for location estimation, e.g., such as a radio frequency retuning time, a parameter indicating a number of bandwidth switches needed by the UE to cover an effective bandwidth and a duration of downlink positioning reference signal symbols, N, that the UE can process in an indicated time period, T, and/or a processing bandwidth, among other parameters. The UE may be configured to transmit a reference signal configuration for the positioning procedure. The reference signal configuration may support frequency hopping with tone-overlap. The reference signal configuration may include an indication of a repetition factor and/or an indication of a frequency hopping factor. In addition, the UE may be configured to perform reference signal measurements, e.g., based on the reference signal configuration.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figures 1A, 1B:
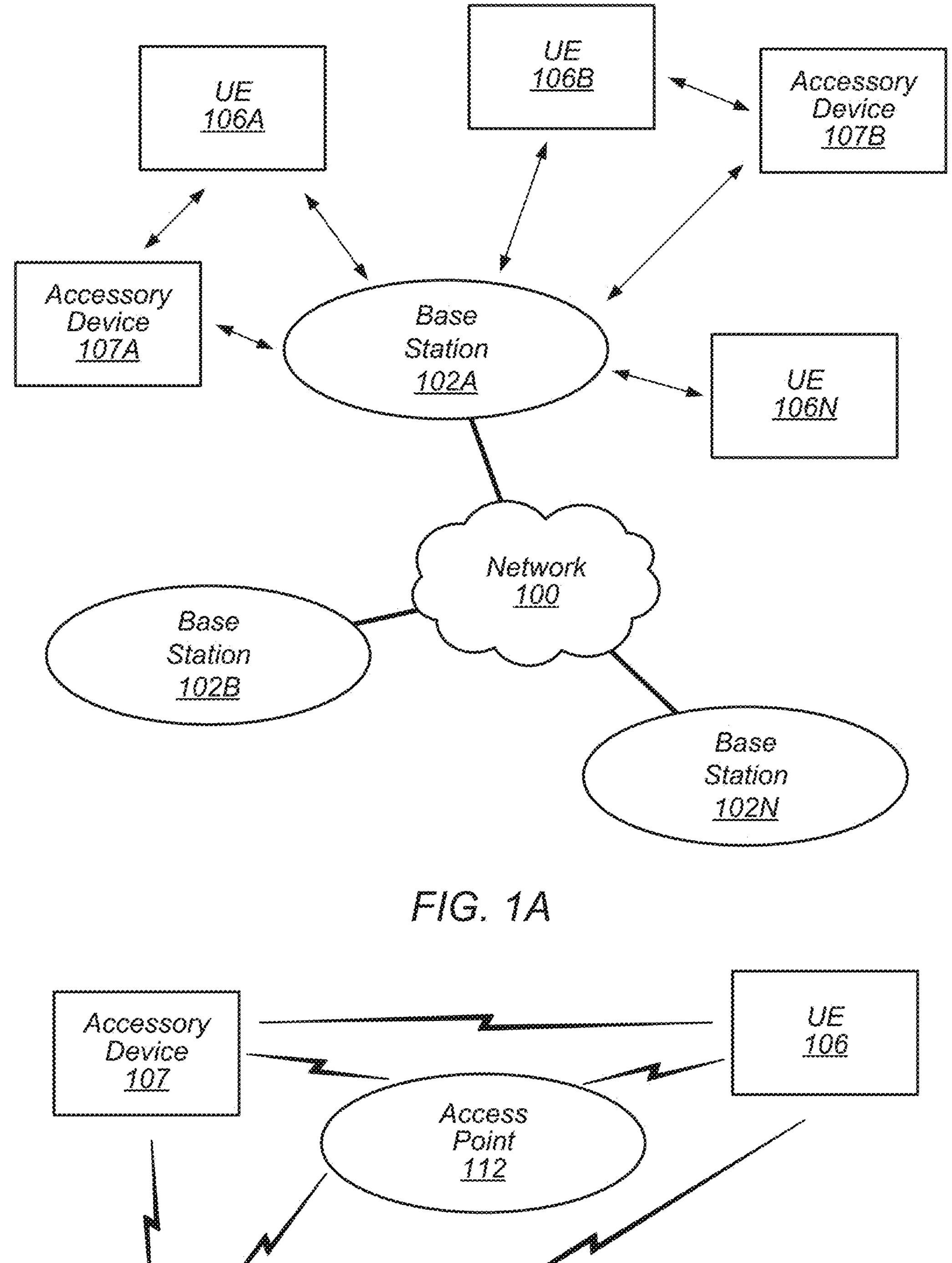
FIG. 1A illustrates an example wireless communication system according to some embodiments.
FIG. 1B illustrates an example of a base station and an access point in communication with a user equipment (UE) device, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI: Channel State Information
CSI-RS: Channel State Information Reference Signal
CMR: Channel Measurement Resource
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator
NPN: Non-Public Network
SNPN: Standalone NPN
CAG: Closed Access Group
SON: Self-Organizing Network
MDT: Minimization of Drive Test

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more wireless devices, such as user devices 106A, 106B, etc., through 106N, as well as accessory devices, such as user devices 107A, 107B. Each of the user devices may be referred to herein as a "user equipment" (UE). Thus, the user devices 106 and 107 are referred to as UEs or UE devices.

The base station (BS) 102A may be a base transceiver station (BTS) or cell site (a "cellular base station") and may include hardware that enables wireless communication with the UEs 106A through 106N as well as UEs 107A and 107B.

The communication area (or coverage area) of the base station may be referred to as a "cell." The base station 102A and the UEs 106/107 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106/107 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106/107 as illustrated in FIG. 1, each UE 106/107 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106/107 may be capable of communicating using multiple wireless communication standards. For example, the UE 106/107 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106/107 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Note that accessory devices 107A/B may include cellular communication capability and hence are able to directly communicate with cellular base station 102A via a cellular RAT. However, since the accessory devices 107A/B are possibly one or more of communication, output power, and/or battery limited, the accessory devices 107A/B may in some instances selectively utilize the UEs 106A/B as a proxy for communication purposes with the base station 102A and hence to the network 100. In other words, the accessory devices 107A/B may selectively use the cellular communication capabilities of its companion device (e.g., UEs 106A/B) to conduct cellular communications. The limitation on communication abilities of the accessory devices 107A/B may be permanent, e.g., due to limitations in output power or the RATs supported, or temporary, e.g., due to conditions such as current battery status, inability to access a network, or poor reception.

FIG. 1B illustrates user equipment 106 (e.g., one of the devices 106A through 106N) and accessory device (or user equipment) 107 (e.g., one of the devices 107A or 107B) in communication with a base station 102 and an access point 112 as well as one another, according to some embodiments. The UEs 106/107 may be devices with both cellular communication capability and non-cellular communication capability (e.g., Bluetooth, Wi-Fi, and so forth) such as a mobile phone, a wearable device, a hand-held device, a computer or a tablet, or virtually any type of wireless device. The accessory device 107 may be a wearable device such as a smart watch. The accessory device 107 may comprise cellular communication capability and be capable of directly communicating with the base station 102 as shown. Note that when the accessory device 107 is configured to directly communicate with the base station, the accessory device may be said to be in "autonomous mode." In addition, the accessory device 107 may also be capable of communicating with another device (e.g., UE 106), referred to as a proxy device, intermediate device, or companion device, using a short-range communications protocol; for example, the accessory device 107 may according to some embodiments be "paired" with the UE 106, which may include establishing a communication channel and/or a trusted communication relationship with the UE 106. Under some circumstances, the accessory device 107 may use the cellular functionality of this proxy device for communicating cellular voice and/or data with the base station 102. In other words, the accessory device 107 may provide voice and/or data packets intended for the base station 102 over the short-range link to the UE 106, and the UE 106 may use its cellular functionality to transmit (or relay) this voice and/or data to the base station on behalf of the accessory device 107. Similarly, the voice and/or data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of hand-held device, a media player, a computer, a laptop or virtually any type of wireless device. Note that when the accessory device 107 is configured to indirectly communicate with the base station 102 using the cellular functionality of an intermediate or proxy device, the accessory device may be said to be in "relay mode."

The UE 106/107 may include a processor that is configured to execute program instructions stored in memory. The UE 106/107 may perform any of the method embodiments described herein by executing such stored instructions. Alternatively, or in addition, the UE 106/107 may include a programmable hardware element such as an FPGA (field-programmable gate array) that is configured to perform any of the method embodiments described herein, or any portion of any of the method embodiments described herein.

The UE 106/107 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106/107 may share one or more parts of a receive and/or transmit chain between multiple wireless communication technologies, such as those discussed above.

In some embodiments, the UE 106/107 may include separate transmit and/or receive chains (e.g., including separate antennas and other radio components) for each wireless communication protocol with which it is configured to communicate. As a further possibility, the UE 106/107 may include one or more radios which are shared between multiple wireless communication protocols, and one or more radios which are used exclusively by a single wireless communication protocol. For example, the UE 106/107 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
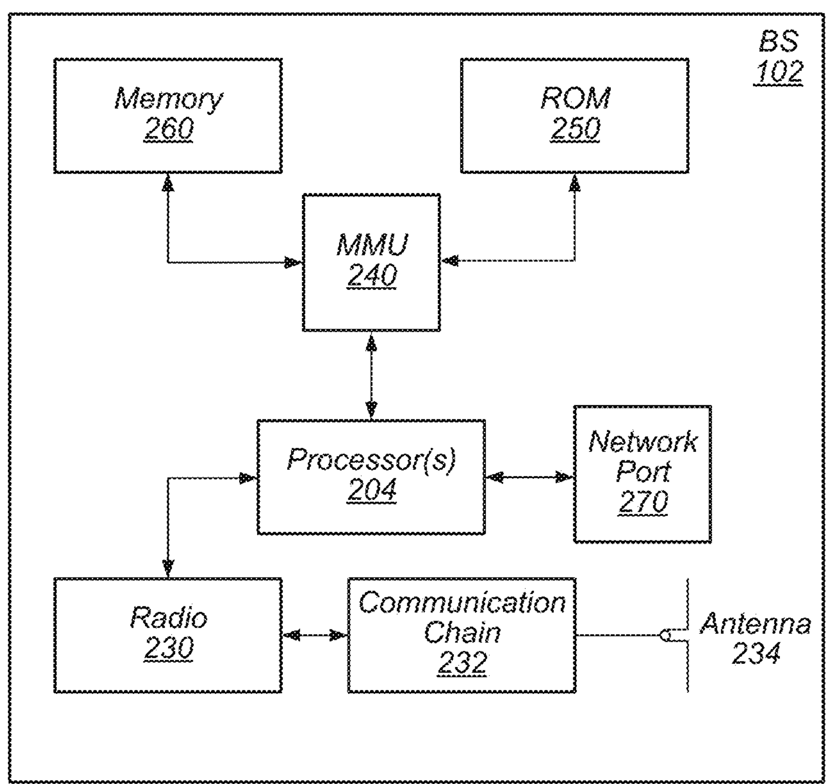
FIG. 2 illustrates an example block diagram of a base station, according to some embodiments.

FIG. 2: Block Diagram of a Base Station

Figure 3:
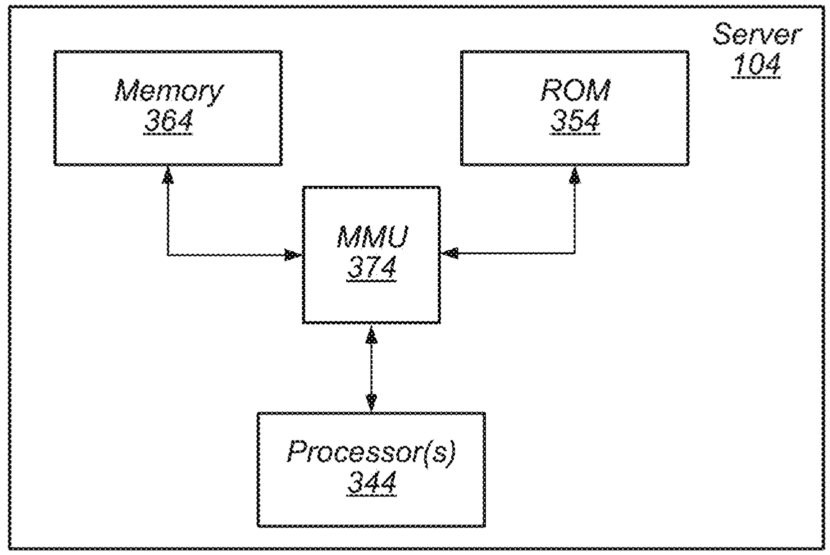
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (Ics) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (Ics) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (Ics) that are configured to perform the functions of processor(s) 344. In addition, each integrated circuit may include circuitry (e.g., first circuitry, second circuitry, etc.) configured to perform the functions of processor(s) 344.

Figure 4:
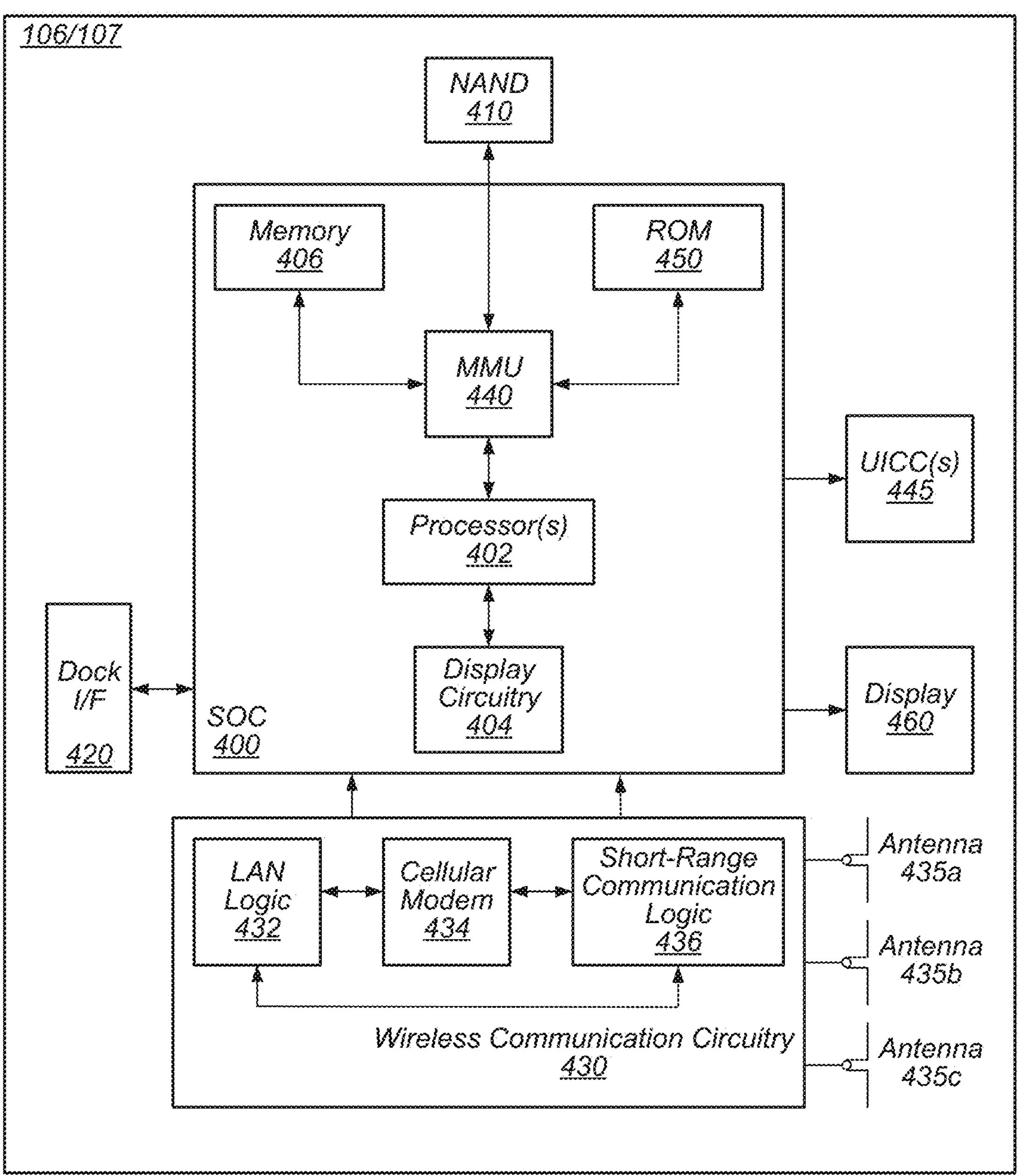
FIG. 4 illustrates an example block diagram of a UE according to some embodiments.

FIG. 4: Block Diagram of a UE

FIG. 4 illustrates an example simplified block diagram of a communication device 106/107, according to some embodiments. It is noted that the block diagram of the communication device of FIG. 4 is only one example of a possible communication device. According to embodiments, communication device 106/107 may be a user equipment (UE) device, a mobile device or mobile station, a wireless device or wireless station, a desktop computer or computing device, a mobile computing device (e.g., a laptop, notebook, or portable computing device), a wearable device, a tablet, an unmanned aerial vehicle (UAV), a UAV controller (UAC) and/or a combination of devices, among other devices. As shown, the communication device 106/107 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106/107 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106/107, and wireless communication circuitry 430. The wireless communication circuitry 430 may include a cellular modem 434 such as for 5G NR, LTE, GSM, etc., and short to medium range wireless communication logic 436 (e.g., Bluetooth™ and WLAN circuitry). In some embodiments, communication device 106/107 may include wired communication circuitry (not shown), such as a network interface card, e.g., for Ethernet.

The wireless communication circuitry 430 may couple (e.g., communicatively; directly or indirectly) to one or more antennas, such as antennas 435*a*, 435*b*, and 435*c* (e.g., 435*a-c*) as shown. The wireless communication circuitry 430 may include local area network (LAN) logic 432, the cellular modem 434, and/or short-range communication logic 436. The LAN logic 432 may be for enabling the UE device 106/107 to perform LAN communications, such as Wi-Fi communications on an 802.11 network, and/or other WLAN communications. The short-range communication logic 436 may be for enabling the UE device 106/107 to perform communications according to a short-range RAT, such as Bluetooth or UWB communications. In some scenarios, the cellular modem 434 may be a lower power cellular modem capable of performing cellular communication according to one or more cellular communication technologies.

In some embodiments, as further described below, cellular modem 434 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular modem 434 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106/107 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106/107 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106/107 may include at least two SIMs. Each SIM may execute one or more SIM applications and/or otherwise implement SIM functionality. Thus, each SIM may be a single smart card that may be embedded, e.g., may be soldered onto a circuit board in the UE 106/107, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106/107 may include a combination of removable smart cards and fixed/non-removable smart cards (such as one or more eUICC cards that implement eSIM functionality), as desired. For example, the UE 106/107 may comprise two embedded SIMs, two removable SIMs, or a combination of one embedded SIMs and one removable SIMs. Various other SIM configurations are also contemplated.

As noted above, in some embodiments, the UE 106/107 may include two or more SIMs. The inclusion of two or more SIMs in the UE 106/107 may allow the UE 106/107 to support two different telephone numbers and may allow the UE 106/107 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106/107 comprises two SIMs, the UE 106/107 may support Dual SIM Dual Active (DSDA) functionality. The DSDA functionality may allow the UE 106/107 to be simultaneously connected to two networks (and use two different RATs) at the same time, or to simultaneously maintain two connections supported by two different SIMs using the same or different RATs on the same or different networks. The DSDA functionality may also allow the UE 106/107 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106/107 may support Dual SIM Dual Standby (DSDS) functionality. The DSDS functionality may allow either of the two SIMs in the UE 106/107 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for positioning reference signals (PRSs) for reduced capacity devices, e.g., in 5G NR systems and beyond, as further described herein.

As described herein, the communication device 106/107 may include hardware and software components for implementing the above features for a communication device 106/107 to communicate a scheduling profile for power savings to a network. The processor 402 of the communication device 106/107 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (Ics) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (Ics) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more Ics that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
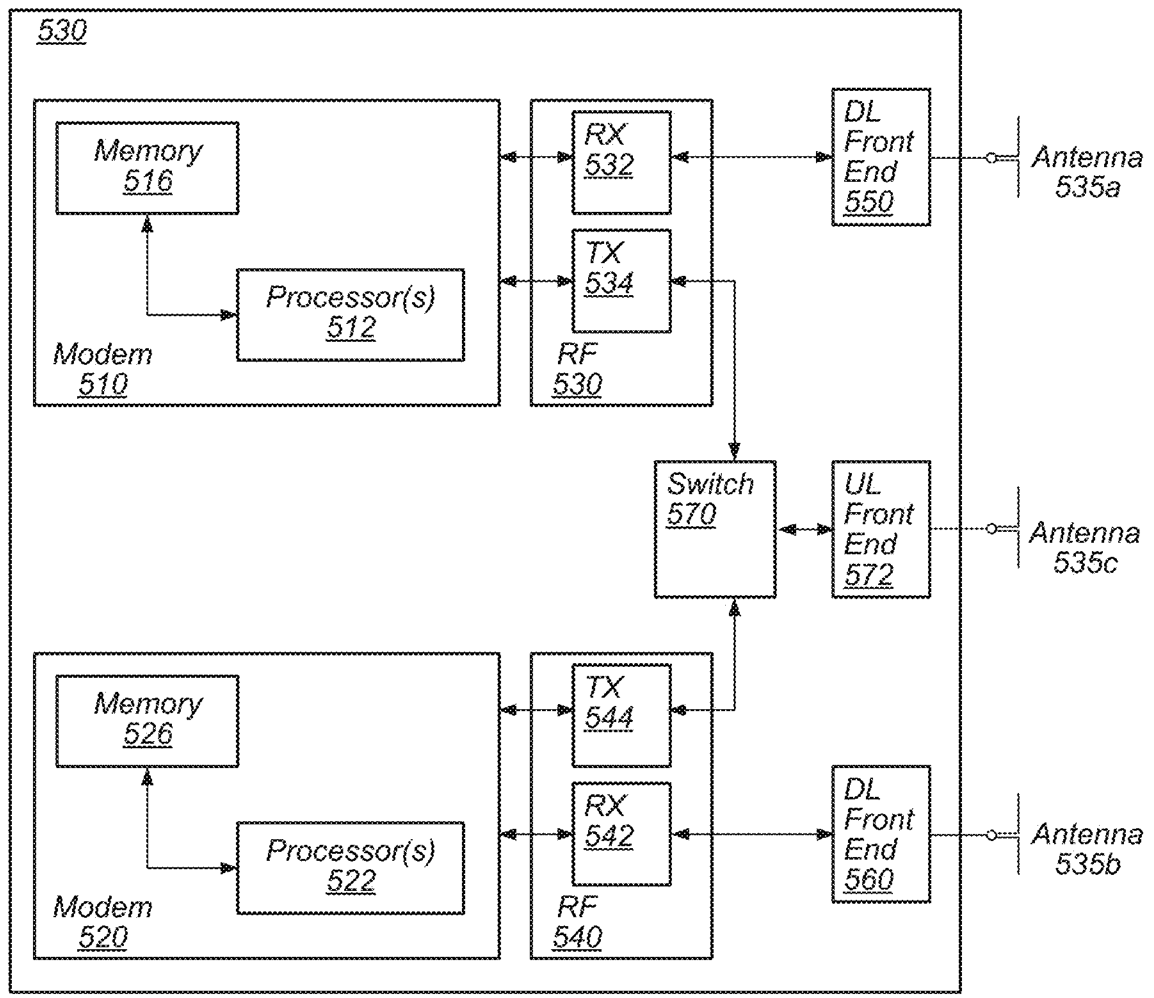
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular modem circuitry 434, may be included in a communication device, such as communication device 106/107 described above. As noted above, communication device 106/107 may be a user equipment (UE) device, a mobile device or mobile station, a wireless device or wireless station, a desktop computer or computing device, a mobile computing device (e.g., a laptop, notebook, or portable computing device), a tablet, a wearable device, and/or a combination of devices, among other devices.

The cellular communication circuitry 530 may couple (e.g., communicatively; directly or indirectly) to one or more antennas, such as antennas 535*a-c* (which may be antennas 435*a-c* of FIG. 4). In some embodiments, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 535*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 535*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 535*c*. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for positioning reference signals (PRSs) for reduced capacity devices, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 535*a-c* may be configured to implement part or all of the features described herein.

In addition, as described herein, processors 512 may include one or more processing elements. Thus, processors 512 may include one or more integrated circuits (Ics) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for positioning reference signals (PRSs) for reduced capacity devices, e.g., in 5G NR systems and beyond, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 535*a-c* may be configured to implement part or all of the features described herein.

In addition, as described herein, processors 522 may include one or more processing elements. Thus, processors 522 may include one or more integrated circuits (Ics) that are configured to perform the functions of processors 522. In addition, each integrated circuit may include circuitry (e.g., first circuitry, second circuitry, etc.) configured to perform the functions of processors 522.

Figure 6A:
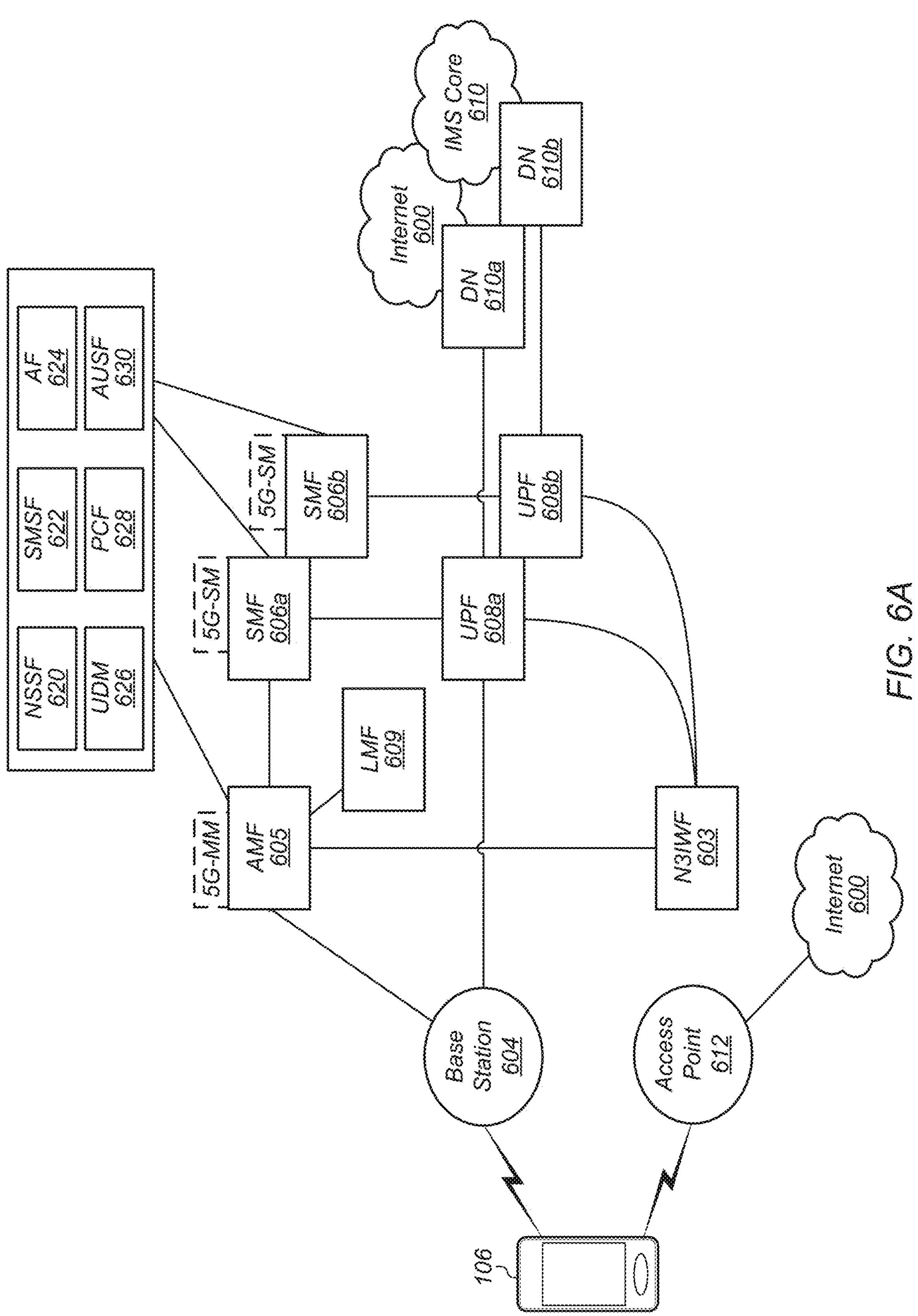
FIG. 6A illustrates an example of a 5G network architecture that incorporates both 3GPP (e.g., cellular) and non-3GPP (e.g., non-cellular) access to the 5G CN, according to some embodiments.
Figure 6B:
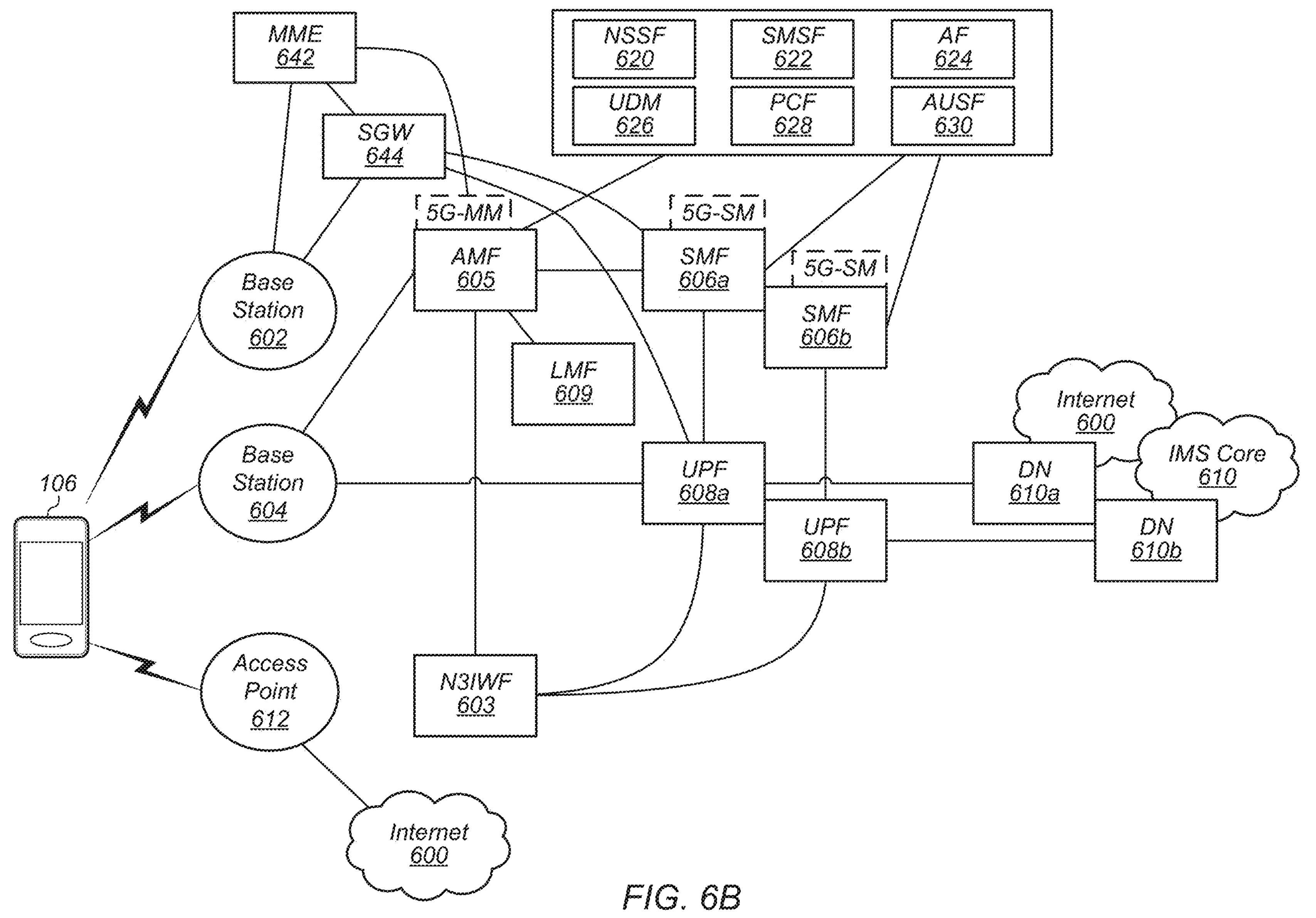
FIG. 6B illustrates an example of a 5G network architecture that incorporates both dual 3GPP (e.g., LTE and 5G NR) access and non-3GPP access to the 5G CN, according to some embodiments.
Figure 7:
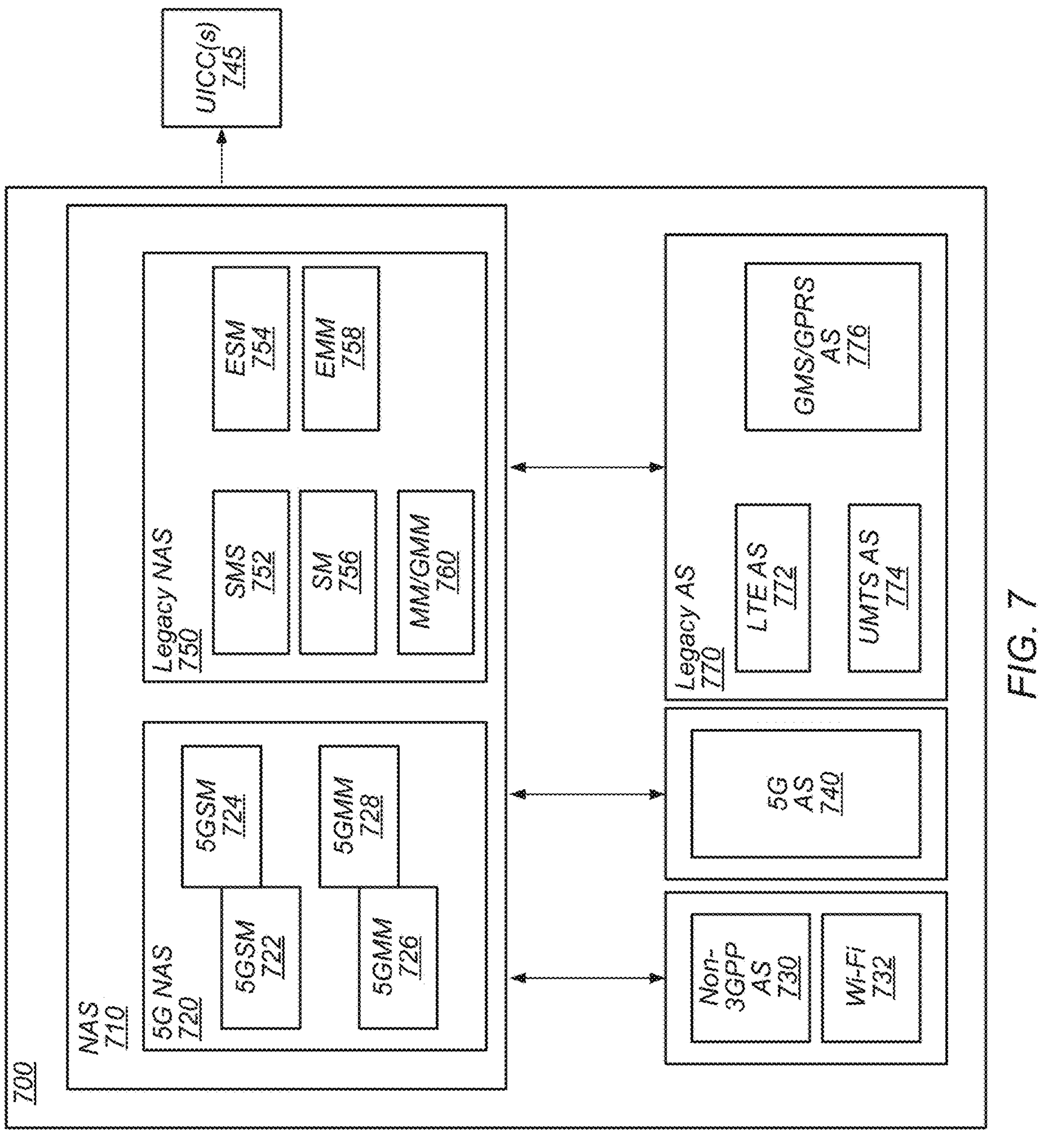
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. As shown, the AMF 605 may be in communication with a location management function (LMF) 609 via a networking interface, such as an NLs interface. The LMF 609 may receive measurements and assistance information from the RAN (e.g., gNB 604) and the UE (e.g., UE 106) via the AMF 605. The LMF 609 may be a server (e.g., server 104) and/or a functional entity executing on a server. Further, based on the measurements and/or assistance information received from the RAN and the UE, the LMF may determine a location of the UE. In addition, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606*a* and an SMF 606*b* of the 5G CN. The AMF 605 may be connected to (or in communication with) the SMF 606*a*. Further, the gNB 604 may in communication with (or connected to) a user plane function (UPF) 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606*a* and the UPF 608*a*. As shown, the AMF 605 may be in communication with an LMF 609 via a networking interface, such as an NLs interface, e.g., as described above, and may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF606*a* and the SMF 606*b* of the 5G CN. The AMF 606 may be connected to (or in communication with) the SMF 606*a*. Further, the gNB 604 may in communication with (or connected to) the UPF 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and IMS core network 610.

Note that in various embodiments, one or more of the above-described network entities may be configured to perform methods for positioning reference signals (PRSs) for reduced capacity devices, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for positioning reference signals (PRSs) for reduced capacity devices, e.g., in 5G NR systems and beyond, e.g., as further described herein.

Positioning Reference Signals for Reduced Capacity Devices

3GPP Release 17 introduced reduced capacity (RedCap) devices (e.g., UEs) with reduced capabilities as compared to existing enhanced mobile broadband (eMBB) devices in both Frequency Range 1 (FR1) (e.g., frequencies below 7.125 GHz and Frequency Range 2 (FR2) (e.g., frequencies above 24.25 GHz). For example, in FR1, a RedCap UE, as compared to existing eMBB devices, may have a reduced maximum UE bandwidth, not support all duplex modes, not support carrier aggregation or dual connectivity, have a lower minimum number of receive branches, have lower downlink and uplink peak data rates for single carrier, and a different maximum modulation order. As another example, in FR2, a RedCap UE, as compared to existing eMBB devices, may have a reduced maximum UE bandwidth, may not support carrier aggregation or dual connectivity, a reduced maximum number of receive branches, and have lower downlink and uplink peak data rates for single carrier. In addition, requirements for various types of RedCap devices (e.g., wearables, industrial wireless sensors, and video surveillance devices) have been specified.

In addition, positioning capabilities for RedCap devices may be limited. For example, RedCap devices may have limited positioning reference signal (PRS) processing bandwidth, limited PRS processing capabilities, limited PRS resource configuration capabilities, and/or limited simultaneous positioning method capabilities, e.g., as compared to existing eMBB devices.

Embodiments described herein provided systems, methods, and mechanisms for positioning reference signals (PRSs) for reduced capacity devices, including systems, methods and mechanisms for defining and/or signaling positioning capabilities for reduced capacity UEs, PRS and SRS configurations for frequency hopping with overlapped resources, downlink PRS muting, positioning support with other reference, and PRS and SRS adaptation. Thus, for example, the embodiments described herein address problems associated with how to define and/or modify positioning capabilities modified to support RedCap UEs (e.g., UEs that may have smaller bandwidths and require frequency hopping), what configuration modifications are needed to accommodate frequency hopping with overlap, how to modify and/or update a muting procedure/configuration to accommodate RedCap UEs, how to use existing reference signals to support positioning for RedCap UEs, and how to adapt a PRS/SRS to accommodate the reduced capabilities (and possibly requirements) for a RedCap UE.

For example, current specifications regarding a duration of downlink PRS symbols, N, a UE can process every T milliseconds assuming a maximum downlink PRS bandwidth in megahertz which is supported and reported by the UE are as follows:

T: {8, 16, 20, 30, 40, 160, 320, 640, 1280}

N: {0.125, 0.25, 0.5, 1, 2, 4, 6, 8, 12, 16, 20, 25, 30, 32, 35, 40, 45, 50}.

In addition, a maximum number of downlink PRS resources that a UE can process in a slot are defined in terms of frequency range 1 (FR1) and frequency range 2 (FR2) for each subcarrier spacing (SCS), e.g.:

FR1: {1, 2, 4, 6, 8, 12, 16, 24, 32, 48, 64} for each SCS: 15 kHz, 30 kHz, 60 kHz FR2: {1, 2, 4, 6, 8, 12, 16, 24, 32, 48, 64} for each SCS: 60 kHz, 120 kHz Note that the UE may report one combination of (N, T) values per band, the UE downlink PRS processing capability is defined for a single positioning frequency layer and is agnostic to downlink PRS combination factor configuration. Note further that the reporting of (N, T) values for the maximum downlink PRS bandwidth is not dependent on SCS.

However, the maximum number of downlink PRS resources that the UE can process in a slot assumes no bandwidth part (BWP) switching or RF retuning (e.g., in the case of frequency hopping, e.g., where the RedCap UE with its maximum PRS bandwidth may hop across a larger frequency bandwidth to create a larger effective PRS bandwidth to improve the positioning performance). Thus, in some instances, given a RedCap UE's need for BWP switching and radio frequency (RF) retuning with PRS in different bands, the reported capabilities of the RedCap UE may be assumed to be within a single BWP. The base station may modify the capability to factor in the frequency hopping behavior. In one example, this could be based on an estimation methodology as shown in equation [1].

$$T_{adj}=N*T+(N*T_{tuning}-1) \quad [1]$$

Note that the tune time (e.g., $T_{tuning}$) may be reported and/or fed back by the RedCap UE as a capability (e.g., a UE capability). In some instances, the RedCap UE may report T, N, and N1, wherein N1 may be a parameter indicating a number of switches needed to cover an effective bandwidth. In some instances, the RedCap UE may report (e.g., as a capability and/or as a UE capability) a number of overlapping PRSs needed to process a bandwidth. In some instances, the UE may report (e.g., as a capability and/or as a UE capability) a processing bandwidth. In some instances, the UE may report (e.g., as a capability and/or as a UE capability) a number of switches. In some instances, N1 may be over a specified bandwidth, e.g., such as 100 MHz and/or a bandwidth indicated by the RedCap UE during initialization/capability signaling. In some instances, a RedCap UE may report a "worst" case T and N based on an agreed assumption of N1.

In some instances, given a RedCap UE's limited processing capabilities, a RedCap UE may feedback parameters (e.g., (N, T) values) assuming no BWP switching or RF retuning (within same BWP) and a base station may modify the (N, T) values based on an estimation methodology. In some instances, a RedCap UE may report (N, T) values along with N1. In some instances, a RedCap UE may report a "worst" case T and N based on an agreed assumption of N1. In some instances, the RedCap UE may report a tuning parameter, e.g., such as BWP switching timing and/or RF switching timing.

In some instances, a configuration of a PRS and/or an SRS (sounding reference signal) may be enhanced to support coherent stitching with tone-overlap (e.g., to avoid a phase discontinuity). In other words, the UE may receive a PRS (and/or send a positioning SRS) that is frequency hopped over a larger bandwidth with overlap in tones for the different hops. Note that the overlapped tones may be combined in such a manner as to ensure that the phases are coherent. For example, in some instances a number of repetitions of a PRS may be increased to enable mapping over a bandwidth (without any frequency domain changes). Currently, a configuration of a PRS may include a resource repetition factor parameter (e.g., such as DL-PRS-ResourceRepetitionFactor) that may indicate a number of times each downlink PRS (DL-PRS) is repeated for a single instance (e.g., DL-PRS resources with the same resource identifier (e.g., such as the same DL-PRS-ResourceID). Further, a configuration of a PRS may include a resource time gap parameter (e.g., such as DL-PRS-ResourceTimeGap) that may indicate an offset (defined as a number of slots) between two repeated instances of a DL-PRS resource with the same resource identifier. Note that a time duration spanned by one instance of a DL PRS is not expected to exceed a configured value of a DL-PRS periodicity. Additionally, a configuration of a PRS may include a DL-PRS periodicity parameter (e.g., such as DL-PRS-Periodicity). In some instances, these parameters may be revised in the 3GPP standard to accommodate both performance improvement and coherent stitching. For example, when 4× hop is needed, then the resource repetition factor parameter may be defined as:

$$T_{rep}^{PRS} \in \{1, 2, 4, 6, 8, 16, 32, \ldots, 24, 64, 128\}$$

Figure 8:
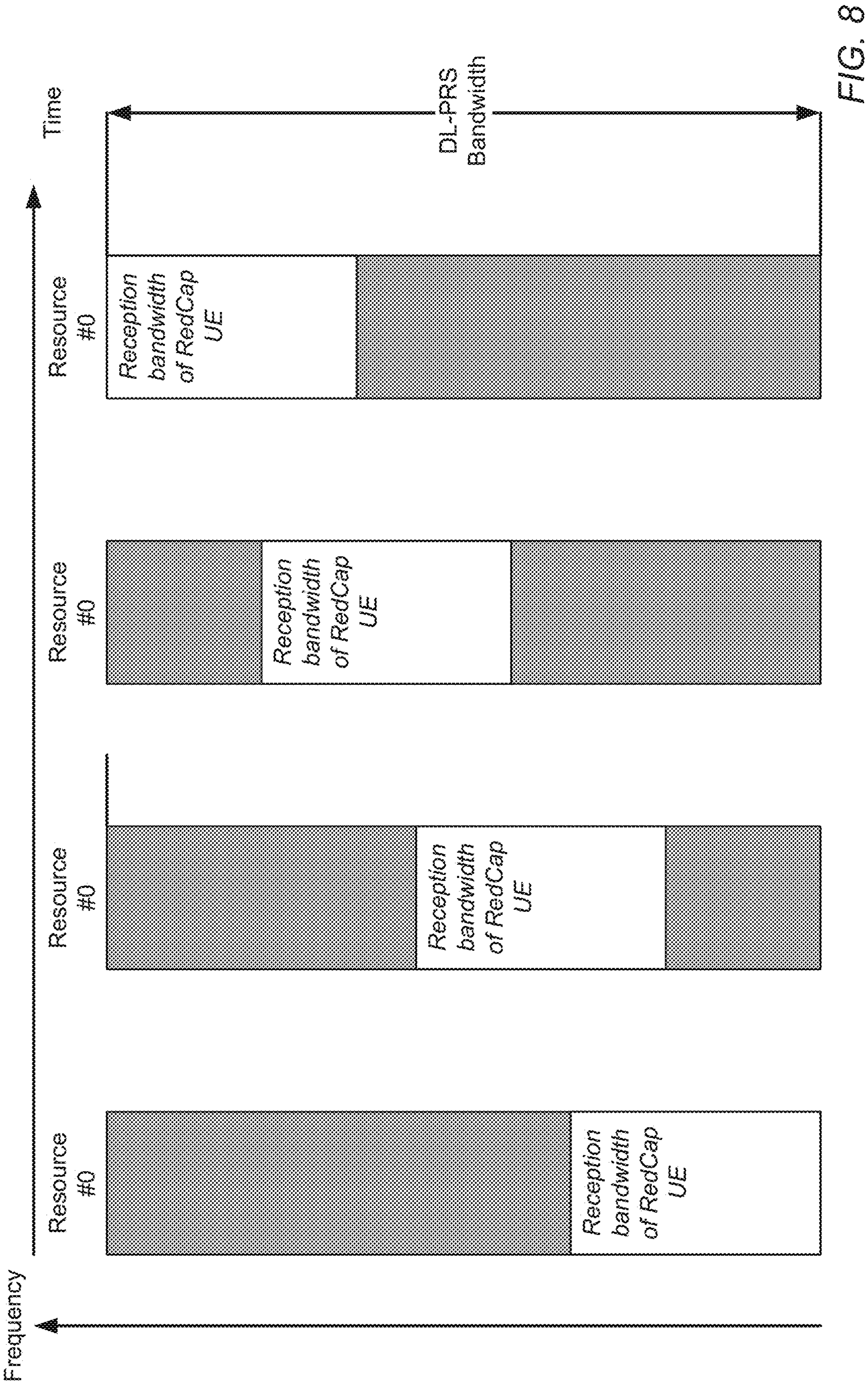
FIG. 8 illustrates a DL-PRS resource instances with multiple repetitions, an actual bandwidth of the DL-PRS, and a RedCap UE's positioning measurement bandwidth, according to some embodiments.

In some instances, to support coherent stitching with tone-overlap (e.g., to avoid a phase discontinuity), a configuration of a PRS may be enhanced to include a scaling factor parameter (e.g., such as DL-PRS-ResourceRepetitionFactor2). In such instances, existing (e.g., as defined in 3GPP standards) parameters may be scaled by the scaling factor parameter. In some instances, a value of the scaling factor parameter may be exchanged by a base station and UE. For example, the UE may indicate one of more of an actual bandwidth, a desired positioning measurement bandwidth, and an overlap during initialization and capability exchange. The base station may then configure the UE with a value of the scaling factor parameter based on one or more of the indicated actual bandwidth, desired positioning measurement bandwidth, and overlap. For example, FIG. 8 illustrates a DL-PRS resource instances with multiple repetitions, an actual bandwidth of the DL-PRS, and a RedCap UE's positioning measurement bandwidth, according to some embodiments.

Figure 9A:
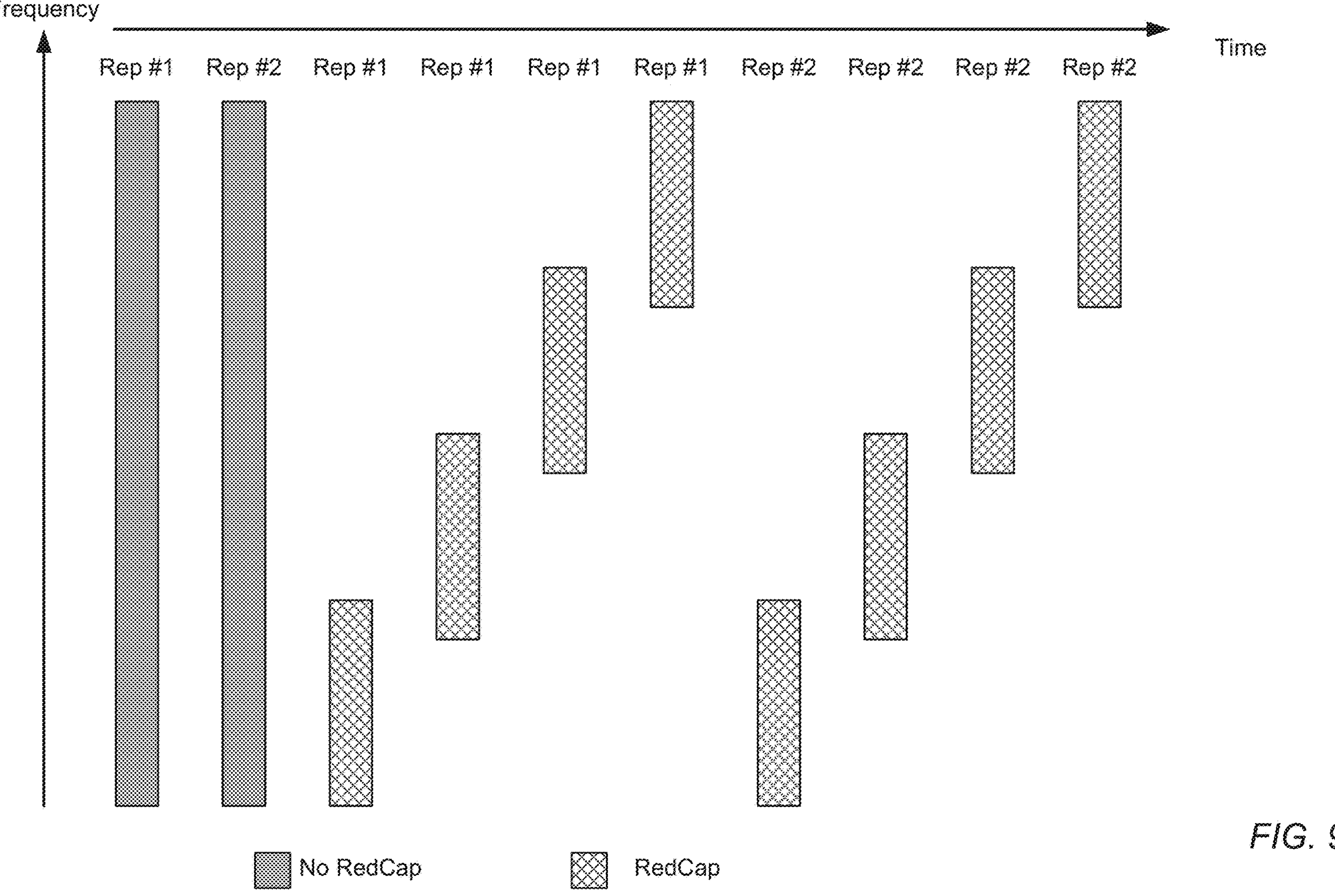
FIGS. 9A-9C illustrate examples of frequency hopping patterns for positioning reference signals, according to some embodiments.
Figure 9B:
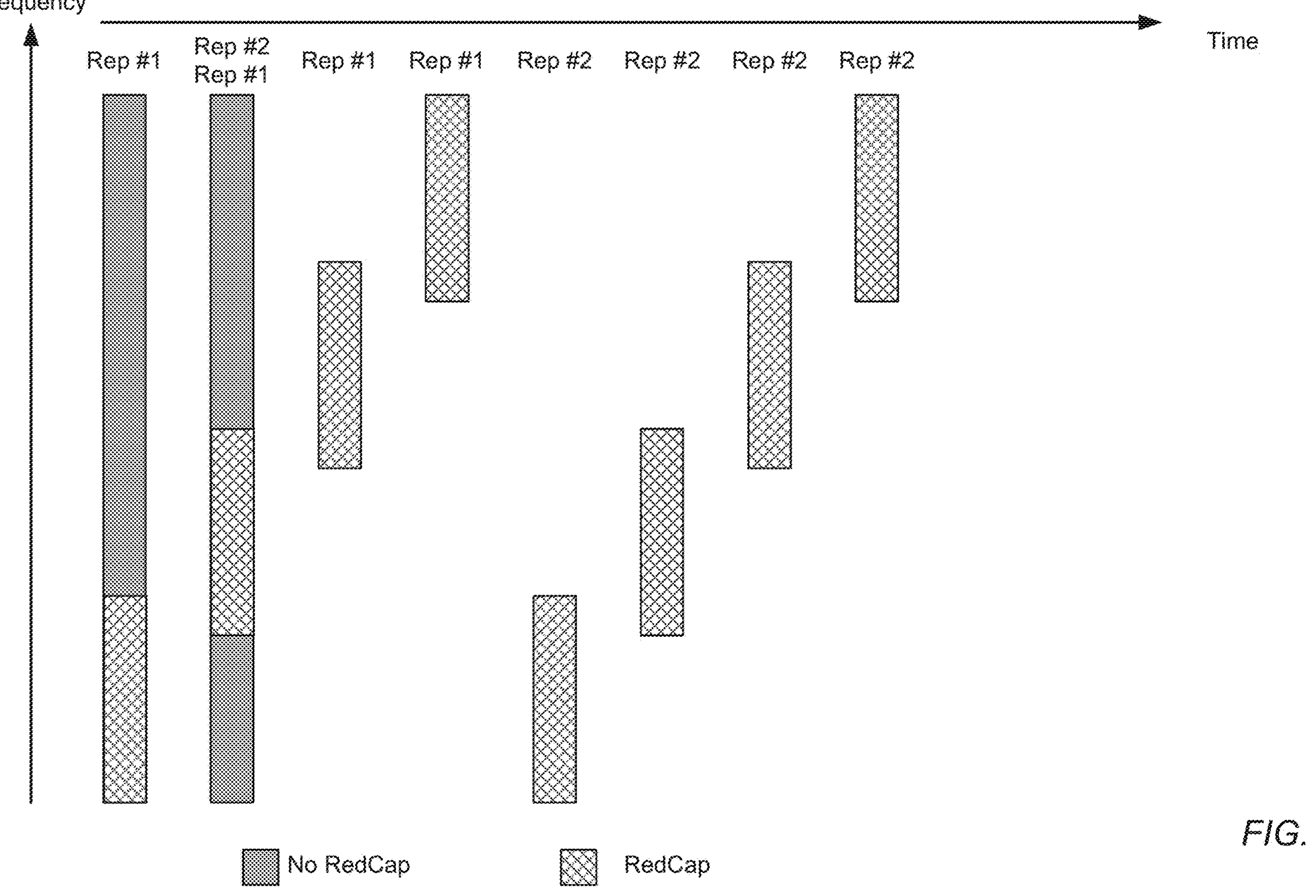
Figure 9C:
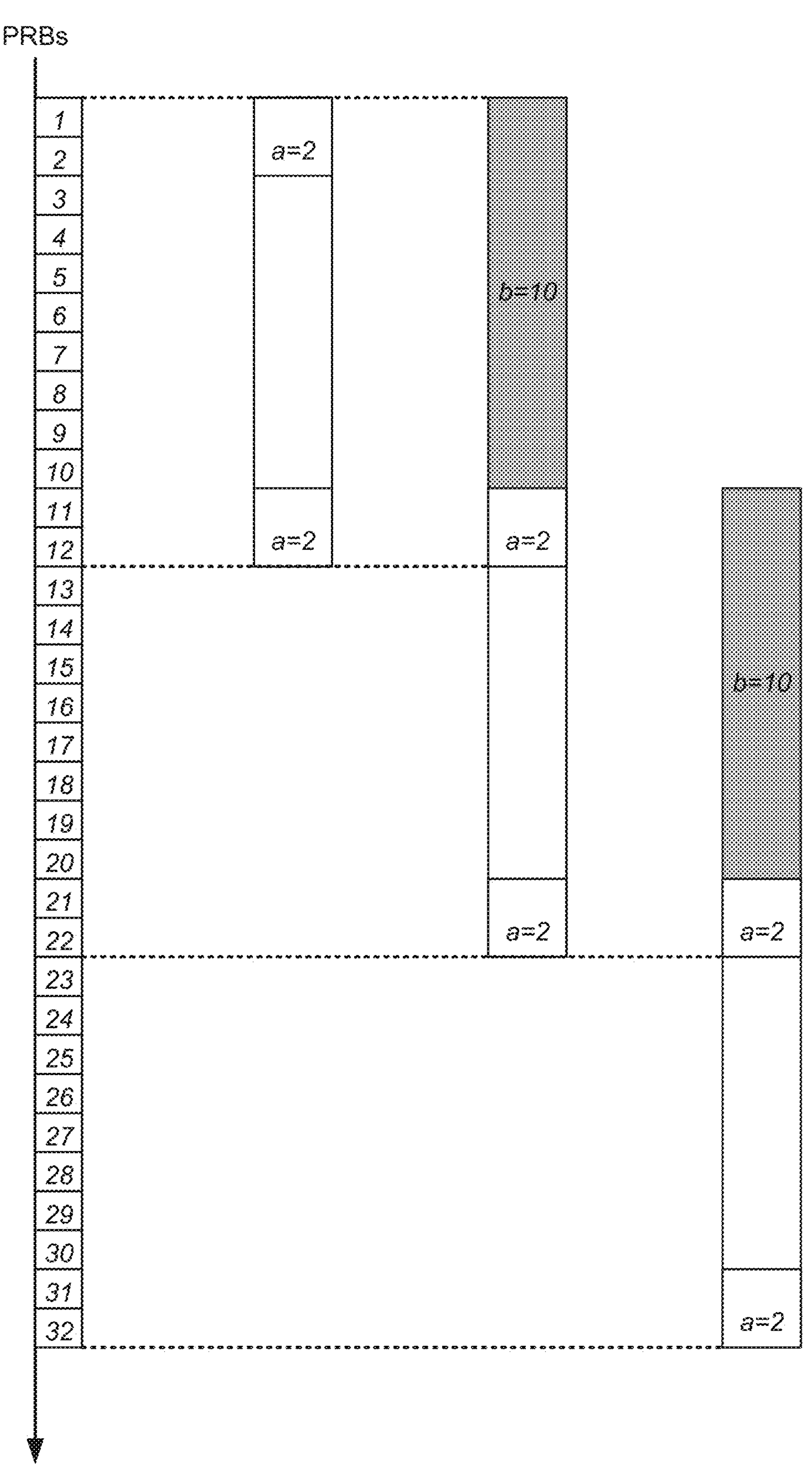

In some instances, to support coherent stitching with tone-overlap (e.g., to avoid a phase discontinuity), a base station may send a specific PRS that a RedCap UE requires for hopping and separate legacy UE (e.g., eMBB UEs) and RedCap UE transmissions, e.g., as illustrated by FIG. 9A. As shown, for a repetition factor of 2 and a hopping factor of 4, a base station may transmit a full bandwidth PRS for non-RedCap UEs (e.g., eMBB UEs) and a frequency hopping (FH) PRS for RedCap UEs, e.g., without time overlap between the full bandwidth PRS and the FH PRS. In some instances, to support coherent stitching with tone-overlap (e.g., to avoid a phase discontinuity), a base station may send a full bandwidth PRS for all UEs and FH PRSs for RedCap UEs, e.g., as illustrated by FIG. 9B. As shown, for a repetition factor of 2 and a hopping factor of 4, a base station may transmit a full bandwidth PRS for all UEs and additional FH PRSs for RedCap UEs, e.g., RedCap UEs may frequency hop for the first two repetitions of the full bandwidth PRS and then receive FH PRSs for the remaining PRS repetitions. Note that hopping pattern should be from a smallest to largest frequency or largest to smallest frequency. In some instances, the hopping pattern may be indicated by the base station, e.g., so long as the entire bandwidth is spanned. In some instances, a PRS configuration may be enhanced to include a parameter indicating a number of resource blocks configured for PRS transmission (e.g., a DL-PRS-ResourceBandwidth). In an example, the parameter may have a granularity of 4 physical resource blocks (PRBs). The parameter may have a minimum of 24 PRBs. The parameter may have a maximum of 272 PRMs. In addition, a PRS configuration may be enhanced to include a parameter indicating a reception bandwidth of a UE (e.g., of a RedCap UE) (e.g., such as a DL-PRS-HoppingBW). Further, an amount of overlap of PRBs may need to be determined. Thus, a base station may indicate, to a UE, a number and/or percentage of overlapping PRBs, a change in a number of PRBs, and/or a start resource. Additionally, a UE may implicitly determine a PRS resource bandwidth and/or a hopping bandwidth. For example, FIG. 9C illustrates an example of overlapping PRBs for frequency hopping, according to some embodiments. As shown, for a PRS resource with a bandwidth of 32 PRBs and a frequency hopping bandwidth of 12 PRBs, an overlap may be defined as 2 PRBs (e.g., a=2) with a change in a number of PRBs defined as 10 (e.g., b=10). Further, the start resources may be defined as {1, 10, and 20} as shown. In some instances, a configuration of a PRS may be enhanced to include a scaling factor parameter (e.g., such as DL-PRS-ResourceRepetitionFactor2). In such instances, existing (e.g., as defined in 3GPP standards) parameters may be scaled by the scaling factor parameter. In some instances, a value of the scaling factor parameter may be exchanged by a base station and UE. For example, the UE may indicate one of more of an actual bandwidth, a desired positioning measurement bandwidth, and an overlap during initialization and capability exchange. The base station may then configure the UE with a value of the scaling factor parameter based on one or more of the indicated actual bandwidth, desired positioning measurement bandwidth, and overlap. Note that a base station may send a different configuration to a RedCap UE and a non-RedCap UE, but send the same PRS to both the RedCap UE and non-RedCap UE. Note that in current implementations, a UE is not expected to process DL PRS without configuration of a measurement gap. Thus, in at least some instances a measurement gap configuration may be enhanced to accommodate new time domain behavior. In some instances, an information element such as NR-PRS-MeasurementInfo-r16 may be enhanced to account for the increased number of repetitions needed to accommodate the frequency domain repetition (e.g., to accommodate frequency hopping). For example, let x be a number of frequency hops, then the parameters nr-MeasPRS-RepetitionAndOffset (which indicates the gap periodicity in milliseconds and offset in number of subframes of a requested measurement gap for performing NR DL-PRS measurements) and nr-MeasPRS-length (which indicates a measurement gap length in milliseconds of a requested measurement gap for performing NR DL-PRS measurements where the measurement gap length is defined by Table 9.1.2-1 of TS 38.133) may both be multiplied by x (e.g., the number of frequency hops). Alternatively, additional parameters may be added to NR-PRS-MeasurementInfo-r16 to account for the increased number of repetitions needed to accommodate the frequency domain repetition (e.g., to accommodate frequency hopping).

Figure 10A:
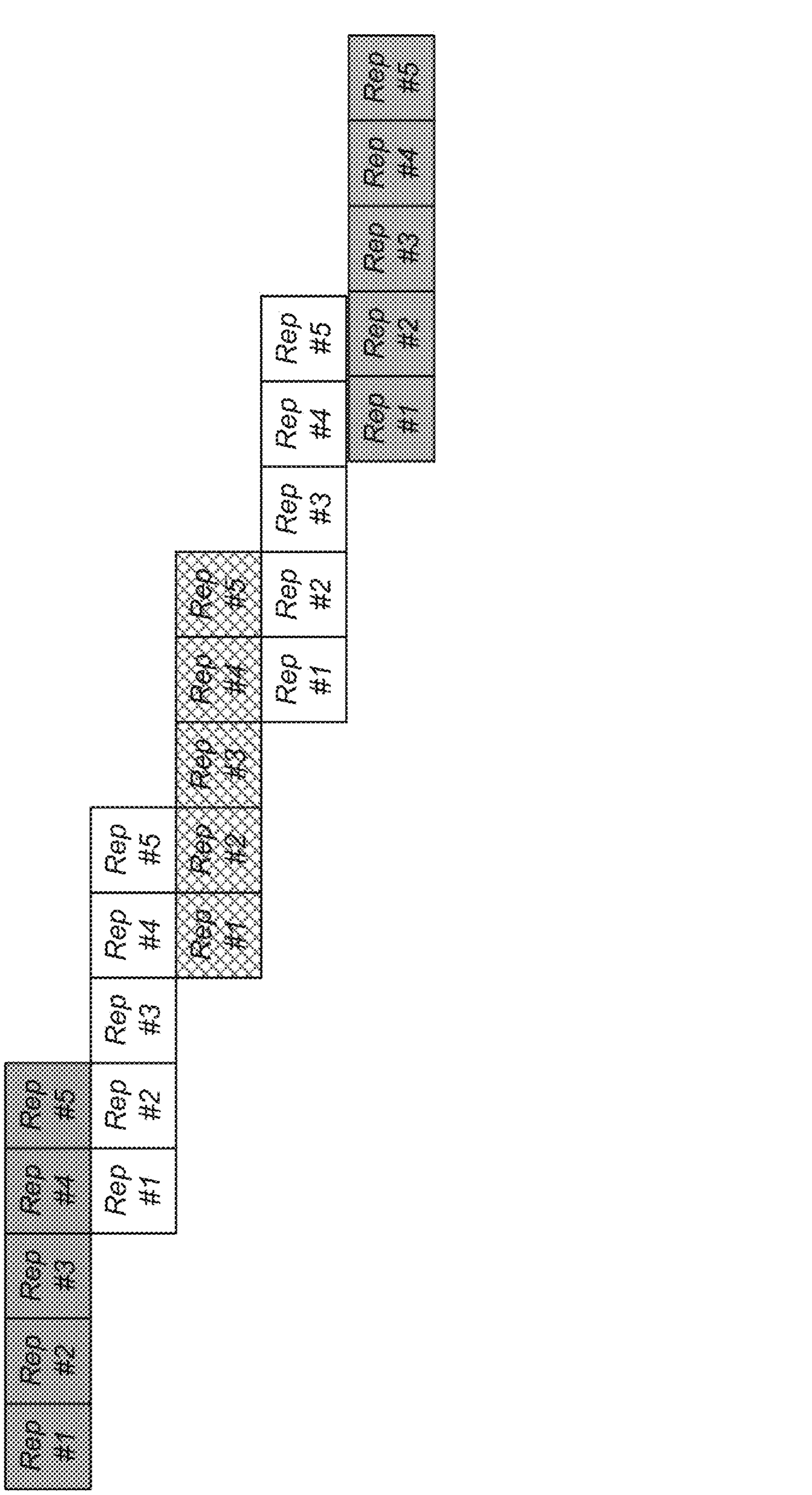
FIGS. 10A-B illustrate examples of muting a portion of positioning reference signal resources, according to some embodiments.
Figure 10B:
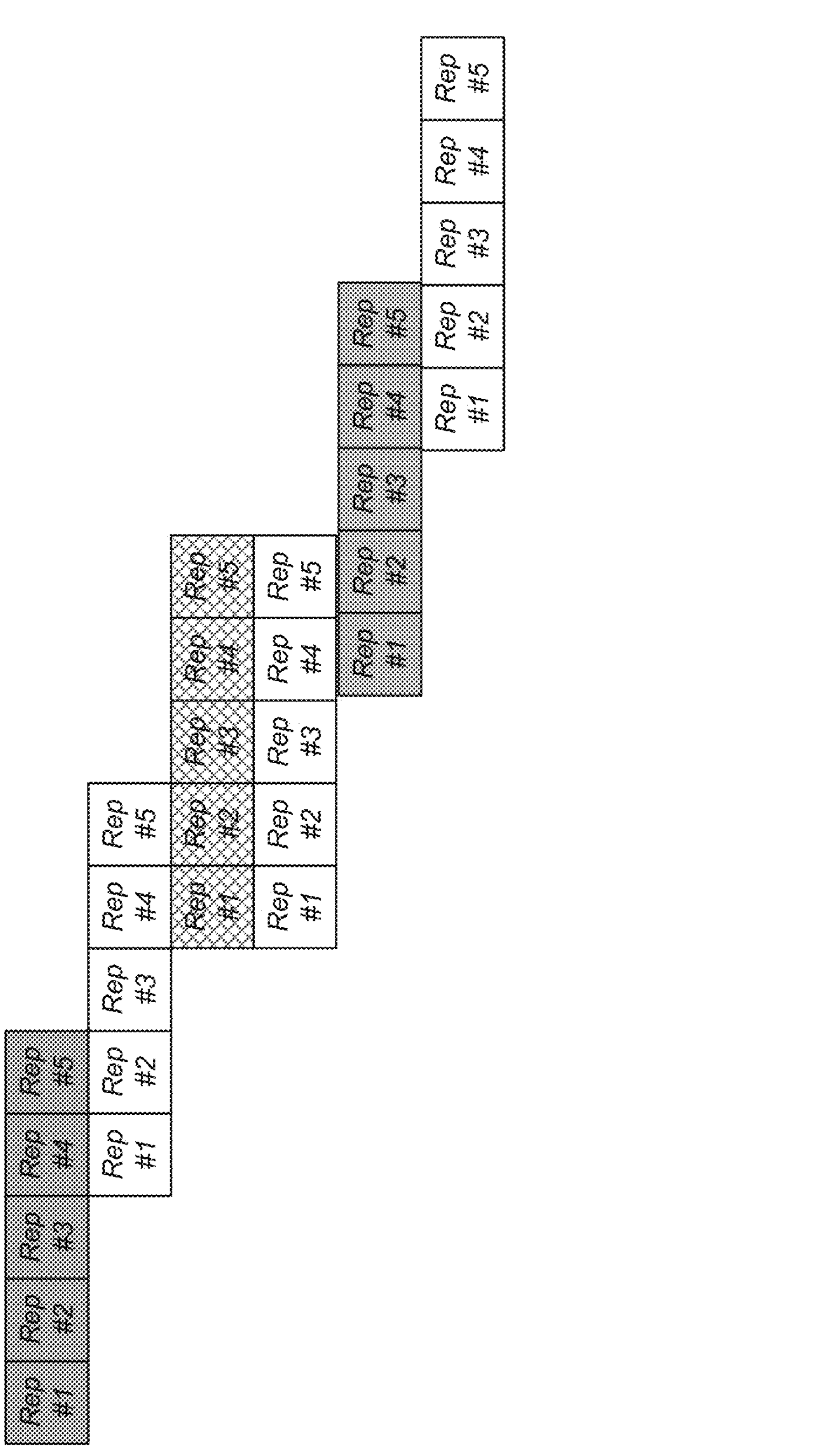

In some instances, to accommodate downlink PRS muting, where each bit in a bitmap corresponds to a configurable number of consecutive instances of a downlink PRS resource set (e.g., a DL-PRSResourceSet parameter), all downlink PRS resources within the PRS resource set may be muted for an instance that is indicated to be muted by the bitmap. In some instances, to accommodate downlink PRS muting, where each bit in a bitmap corresponds to a single repetition index for each downlink PRS resource within each instance of a downlink PRS resource set and a length of the bitmap is equal to a downlink PRS resource repetition factor (e.g., a DL-PRS-ResourceRepetitionFactor), individual hops may be muted. In some instances, a mutingOption2-modified parameter may need to be adjusted to DL-PRS-ResourceRepetitionFactor*DL-PRSResourceRepetitionFactor2. Note that muting within a hop may not be allowed. Note further, when an individual transmission is muted, a phase discontinuity, e.g., as illustrated by FIG. 10A, may be accepted or may be prevented by shifting of transmissions, e.g., as illustrated by FIG. 10B. As shown in FIG. 10A, when a transmission is muted, there may be a phase discontinuity caused by the muting, however, transmissions may continue as if the muted transmission was not muted. As shown in FIG. 10B, when a transmission is muted, there may be a phase discontinuity caused by the muting, however, transmissions may be shifted as if the muted transmission did not occur, e.g., such that a transmission after the muted transmission remains in phase with a transmission immediately prior to the muted transmission.

In some instances, sounding reference signal (SRS) frequency hopping for a positioning SRS with overlap may be defined. In such instances, a repetition factor may be introduced to indicate a number of repetitions (e.g., to configure a number of positioning SRS repetitions), e.g., similar to a PRS number of repetitions factor. Additionally, a frequency hopping factor may be introduced to indicate a number and/or percentage of overlapping resource blocks (e.g., a percentage of resource blocks may be added to a legacy definition). In some instances, a legacy method may be used in which parameters for frequency hopping (e.g., c-SRS, b-SRS and b-hop) are indicated and an SRS bandwidth and hopping positions are identified. In addition, an overlap for each hop may be explicitly and/or implicitly indicated, e.g., similar to the PRS scenario described above.

In some instances, reference signals other than a PRS may be used to estimate a channel and/or a position of a UE, for example any of a demodulation reference signal (DMRS), a channel-state information reference signal (CSI-RS), a tracking reference signal (TRS), and/or a secondary synchronization signal (SSS) may be used to estimate a channel and/or a position of a UE. For example, in some instances, a PRS may be used in conjunction (and/or combination) with an other references signal (RS) to estimate UE position. In some instance, a UE may exchange capability signaling with a location management function (LMF), such as LMF 609, to indicate that the UE's position may be estimated using multiple reference signals (e.g., using a PRS and an additional reference signal). Then, once additional reference signals are configured, the UE may make measurements associated with the reference signals and send a measurement report to the LMF for positioning procedure. Note that such a positioning procedure may be activated with measurement feedback including reference signal measurement feedback and a reference signal transmit configuration. As another example, in some instances, reference signals other than a PRS may be used to estimate the UE's position, e.g., when there are reduced accuracy requirements from UE as compared to using a PRS. In some instances, to trigger usage of reference signals other than a PRS for position estimation, the UE may indicate, to an LMF, such as LMF 609, that the UE has not changed position (e.g., no change in position) and the LMF may trigger maintenance mode with reference signaling other than a PRS used to estimate the UE's position. In some instances, the UE may exchange capability signaling with the LMF to indicate reduced accuracy requirements and/or to indicate support for maintenance mode position measurement. In some instances, the UE/LMF may ensure non-PRS reference signals and associated measurements are configured. In some instances, e.g., when a UE is in a reduced capability mode, the UE may perform a normal positioning operation with the LMF but use non PRS reference signals. In some instances, e.g., when a UE is in a maintenance mode, the UE may indicate, to the LMF, a low mobility mode with traditional positioning measurement feedback. The LMF may then change to a low mobility mode, e.g., the UE may disable a PRS/positioning SRS measurement procedure and activate a CSI-RS/DMRS/SSS configuration and feedback. In some instances, e.g., when a UE is in a normal mode of operation, the UE may indicate (and/or the LMF may detect) movement/mobility and the LMF may trigger and/or activate a normal positioning procedure.

In current implementations, a fixed SRS configuration that a UE should use at each positioning period is defined, regardless of UE mobility change and/or power limitations. Additionally, an SRS transmission is characterized by a given time-frequency density which is maintained for all occurrences during a periodic localization process. However, such an approach is sub-optimal for RedCap devices which would need to ensure a periodic SRS transmission even though the device position remains fixed from one location update to an other. Thus, a flexible uplink positioning session with respect to time-frequency resource allocation and an ability to tune a periodicity of the positioning session may be beneficial in terms of power savings for a RedCap UE. In some instances, multiple reference signal configurations for positioning may be specified and/or configured with fast switching between SRS and PRS configurations. For example, for PRS, there may be multiple resource sets within a positioning frequency layer (PFL). Note that a PRS configuration may specify a PFL, a PRS resource set, and/or a PRS resource. The PFL may be specified based on various parameters such as DL-PRS-SubcarrierSpacing, DL-PRS-CyclicPrefix, and/or DL-PRS-PointA. The PRS resource set may be specified based on various parameters such as DL-PRS-ResourceSetID, DL-PRS-Periodicity, DL-PRS-ResourceRepetitionFactor, DL-PRS-ResourceTimeGap, DL-PRS-ResourceSetSlotOffset, DL-PRS-CombSizeN, DL-PRS-ResourceBandwidth, DL-PRS-StartPRB, DL-PRS-MutingPattern, and/or DL-PRS-ResourceSetSlotOffset. The PRS resource may be specified based on various parameters such as DL-PRS-Resourceid, DL-PRS-Sequenceid, DL-PRS-ReOffset, DL-PRS-ResourceSlotOffset, DL-PRS-ResourceSymbolOffset-r16, DL-PRS-NumSymbols: (L, KT) (where (L, KT)={2, 2}, {4, 2}, {6, 2}, {12, 2}, {4, 4}, {12, 4}, {6, 6}, {12, 6}, and {12, 12}), and/or DL-PRS-QCL-info. Note further that a positioning SRS may be specified by an SRS-PosResourceSet-r16 parameter and an SRS position resource set parameter. The SRS-PosResourceSet-r16 parameter may include an srs-PosResourceSetId-r16 parameter defined by an srs-PosResourceIdList-r16 and a resourceType-16 parameter (e.g., that specifies aperiodic, semi-persistent, or periodic as the resource type), an alpha-r16 parameter, a po-r16 parameter, and/or a pathlossReferenceRS-Pos-r16 parameter (e.g., which may include an ssb-IndexServing-r16 parameter, an ssb-Ncell-r16 parameter, an SSB-InfoNcell-r16 parameter, and/or a dl-PRS-r16 parameter). The SRS positioning resource parameter may include an srs-PosResourceId-r16, a numberPorts parameter (may equal 1 to specify a single port), a transmissionComb-r16 parameter (specifying n2, n4, and n8), a resourceMappping-r16 parameter, a startPosition-r16 parameter, an nrofSymbols-r16 parameter, a freqDomainShift-r16 parameter, a feqHopping-r16 parameter, another frequency hopping parameter, a groupORSequenceHopping-r16 parameter, resourceType-r16 parameter, aperiodic-r16 parameter, a semi-persisten-r16 parameter, a periodic-r16 parameter, a sequenceId-r16 parameter, and/or a spatialRelationInfoPos-r16 parameter. In some instances, a downlink control information (DCI) message and/or a medium access control (MAC) control element (CE) may indicate a PRS resource set for the UE to use. As another example, for SRS, there may be multiple SRS resources within a resource set with each having a periodicity and offset. In some instances, one configuration for positioning may be specified and/or configured with switching between sub-configurations (e.g., where sub-configurations have differing periodicities). For example, for PRS, each resource set may be configured with multiple periodicities. As another example, for SRS, a resource may be configured with multiple periodicities and/or offsets. In some instances, a UE may indicate, to an LMF, that the UE has not moved and/or that the UE requires a change to a configuration. In some instances, a UE may indicate, to an LMF, that the UE has used a subset of a PRS configuration for measurement (e.g., the PRS is over-configured) and/or that the UE will skip measurements for a number (e.g., X) PRS occasions. Note that when there is a skipping or muting of a specific hop, the UE may adjust transmission to ensure overlap.

Figure 11:
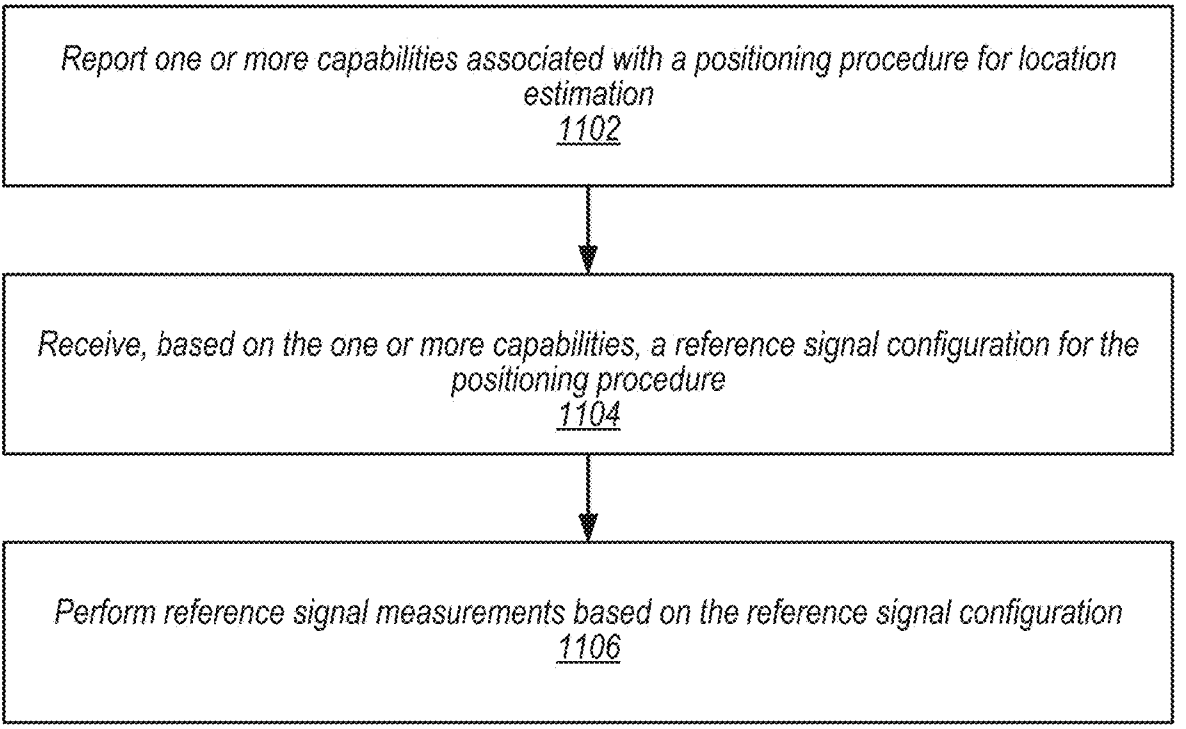
FIG. 11 illustrates a block diagram of an example of a method for location estimation for reduced capacity devices, according to some embodiments.

FIG. 11 illustrates a block diagram of an example of a method for location estimation for reduced capacity devices, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106 and/or UE 107, may report, to a network (e.g., to a base station, such as base station 102 or an LMF, such as LMF 609) one or more capabilities associated with a positioning procedure for location estimation. In some instances, the one or more capabilities may include a radio frequency retuning time. In some instances, the one or more capabilities may include a parameter indicating a number of bandwidth switches needed by the UE to cover an effective bandwidth and (at least in some instances) a duration of downlink positioning reference signal symbols, N, that the UE can process in an indicated time period, T. The number of bandwidth switches may be over an indicated bandwidth and the one or more capabilities may further include the indicated bandwidth. In some instances, the one or more capabilities may include a processing bandwidth. In some instances, the one or more capabilities may include a duration of downlink positioning reference signal symbols, N, that the UE can process in an indicated time period, T and N and T may be based, at least in part, on a number of bandwidth switches needed by the UE to cover an effective bandwidth. The number of bandwidth switches needed by the UE to cover an effective bandwidth may be negotiated between the UE and a base station. In some instances, the one or more capabilities may include a duration of downlink positioning reference signal symbols, N, that the UE can process in an indicated time period, T and N and T may be based, at least in part, on the UE assuming no bandwidth part switching or radio frequency retuning within a bandwidth part. In some instances, the one or more capabilities may include a tuning parameter. The tuning parameter may specify at least one of a bandwidth switching timing or a radio frequency switching timing and N and T may be modified, based at least in part, on the tuning parameter.

At 1104, the UE may receive, from the network and based on the one or more capabilities, a reference signal configuration for the positioning procedure. The reference signal configuration may support coherent stitching (e.g., frequency hopping) with tone-overlap. In some instances, to support coherent stitching with tone-overlap, the reference signal configuration may include additional repetitions that enable mapping over a bandwidth. In some instances, to support coherent stitching with tone-overlap, the reference signal configuration may include a scaling factor. The scaling factor may be based, at least in part, on an actual bandwidth, a desired positioning measurement bandwidth, and an overlap indicated by the UE. In some instances, the reference signal configuration may include a number of resource blocks configured for positioning reference signal (PRS) transmission. In some instances, the reference signal configuration may include one or more of a number of overlapping physical resource blocks (PRBs), a percentage of overlapping PRBs, a change in a number of PRBs, and/or starting PRBs. In some instances, the reference signal configuration may include a measurement gap.

At 1106, the UE may perform reference signal measurements based on the reference signal configuration. In some instances, to perform the reference signal measurements based on the reference signal configuration, the UE may perform reference signal measurements on frequency hopping (FH) positioning reference signals (PRSs) dedicated to reduced capacity devices. In some instances, to perform reference signal measurements on FH PRSs, the UE may receive a first repetition of a FH PRS in a first frequency bandwidth that may be a subset of a full bandwidth used for full bandwidth PRSs, switch to a second frequency bandwidth that may be overlapped with the first frequency bandwidth and is a subset of the full bandwidth, and receive a second repetition of the FH PRS in the second frequency bandwidth. In some instances, at least the first repetition of the FH PRS may be a first repetition of a full bandwidth PRS.

In some instances, to perform reference signal measurements based on the reference signal configuration, the UE may mute at least a portion of downlink position reference signal (PRS) resources. In some instances, muted downlink PRS resources may be indicated by a bitmap that may correspond to a configurable number of consecutive instances of a downlink PRS resource set. In some instances, all downlink PRS resources within the PRS resource set are muted for an instance indicated by the bitmap. In some instances, muted downlink PRS resources may be indicated by a bitmap where each bit in the bitmap may correspond to a single repetition index for each downlink PRS resource within each instance of a downlink PRS resource set. In some instances, individual hops of the downlink PRS resource set may be muted. In some instances, a length of the bitmap may correspond to a downlink PRS resource repetition factor. In some instances, a phase discontinuity may be generated by muting at least the portion of PRS resources. In such instances, transmission of the PRS resources may continue without regard to the phase discontinuity or transmission of the PRS resources may be shifted to account for the phase discontinuity such that a PRS transmission immediately after the muted portion of PRS resources may be shifted to remain in phase with a transmission that occurred immediately prior to the muted portion of the PRS resources.

In some instances, the UE may transmit a reference signal configuration for the positioning procedure. The reference signal configuration may support frequency hopping with tone-overlap. In some instances, the reference signal configuration may include an indication of a repetition factor. In some instances, the reference signal configuration may include an indication of a frequency hopping factor. The frequency hopping factor may indicate a number of overlapping resource blocks. In some instances, the frequency hopping factor may indicate a percentage of overlapping resource blocks.

In some instances, to perform the reference signal measurements based on the reference signal configuration, the UE may perform reference signal measurements on at least one non-positioning reference signal (PRS) reference signal. In some instances, the non-PRS reference signal may include at least one of a demodulation reference signal (DMRS), a channel-state information reference signal (CSI-RS), a tracking reference signal (TRS), and/or a secondary synchronization signal (SSS). In some instances, to perform the reference signal measurements on the at least one non-PRS reference signal, the UE may exchange, with a location management function (LFM), capability signaling indicate that the UE's position may be estimated using at least one non-PRS reference signal and receive, from the LMF, a configuration for the at least one non-PRS reference signal. In some instances, to perform the reference signal measurements on the at least one non-PRS reference signal, the UE may indicate, to an LMF, a reduction in accuracy requirements for UE positioning that may be base at least in part, on a mobility condition of the UE. The mobility condition of the UE may be substantially stationary since a prior positioning measurement. In some instances, to perform the reference signal measurements on the at least one non-PRS reference signal, the UE may indicate, to an LMF, a maintenance mode for UE positioning determination capability. In such instances, usage of the at least one non-PRS reference signal may be based on the UE supporting the maintenance mode for UE positioning determination.

In some instances, the reference signal configuration may include a plurality of reference signal configurations. In such instances, the UE may receive an indication of which reference signal configuration of the plurality of reference signal configurations to use for performing the reference signal measurements. The indication may be received via one of a downlink control information (DCI) message or a medium access control (MAC) control element (CE). In some instances, each reference signal configuration of the plurality of reference signal configurations may include a different periodicity.

Figure 12:
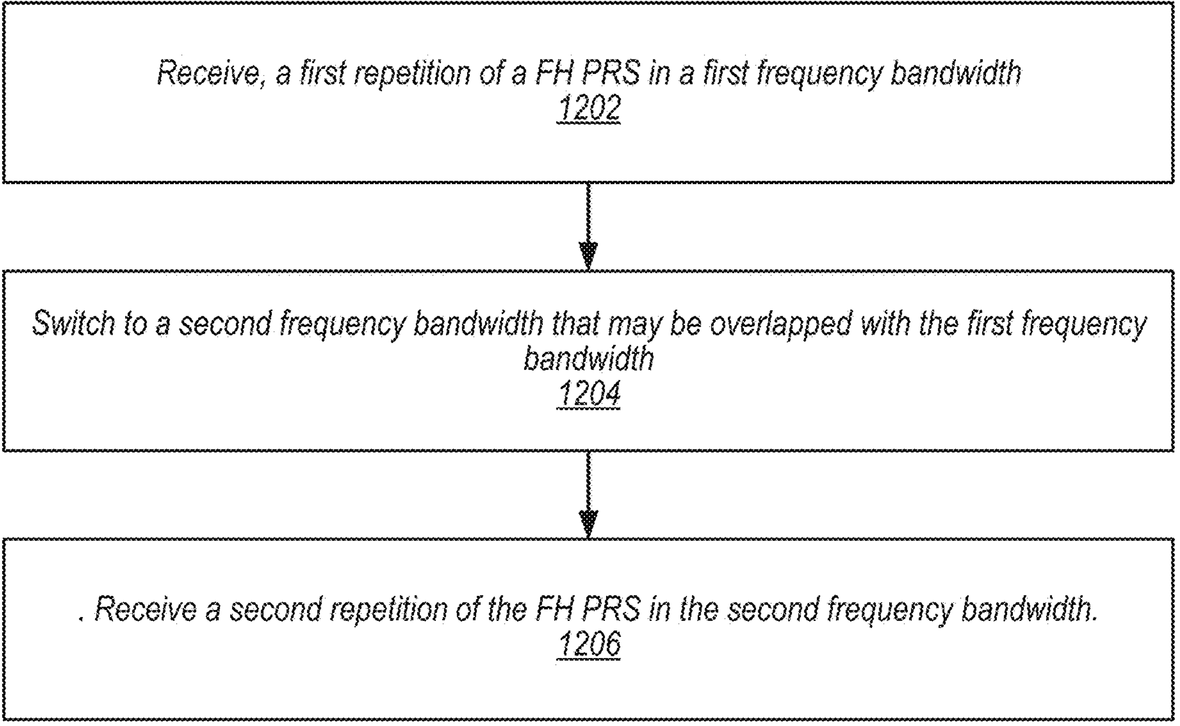
FIG. 12 illustrates a block diagram of an example of a method for performing location estimation for reduced capacity devices using FH PRSs, according to some embodiments.

FIG. 12 illustrates a block diagram of an example of a method for performing location estimation for reduced capacity devices using FH PRSs, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106 and/or UE 107, may receive, from a network (e.g., from a base station 102 and/or an LMF 609), a first repetition of a FH PRS in a first frequency bandwidth. The first frequency bandwidth may be a subset of a full bandwidth used for full bandwidth PRSs.

In some instances, at least the first repetition of the FH PRS is a first repetition of a full bandwidth PRS.

At 1204, the UE may switch to a second frequency bandwidth that may be overlapped with the first frequency bandwidth. The second frequency bandwidth may be a subset of the full bandwidth.

At 1206, the UE may receive a second repetition of the FH PRS in the second frequency bandwidth.

In some instances, the UE may report, to the network, measurements of at least the first repetition of the FH PRS and the second repetition of the FH PRS. The UE may receive, from the network, an indication of a position of the UE.

In some instances, the UE may report to the network, one or more capabilities associated with a positioning procedure for location estimation. In some instances, the one or more capabilities may include a radio frequency retuning time. In some instances, the one or more capabilities may include a parameter indicating a number of bandwidth switches needed by the UE to cover an effective bandwidth and (at least in some instances) a duration of downlink positioning reference signal symbols, N, that the UE can process in an indicated time period, T. The number of bandwidth switches may be over an indicated bandwidth and the one or more capabilities may further include the indicated bandwidth. In some instances, the one or more capabilities may include a processing bandwidth. In some instances, the one or more capabilities may include a duration of downlink positioning reference signal symbols, N, that the UE can process in an indicated time period, T and N and T may be based, at least in part, on a number of bandwidth switches needed by the UE to cover an effective bandwidth. The number of bandwidth switches needed by the UE to cover an effective bandwidth may be negotiated between the UE and a base station. In some instances, the one or more capabilities may include a duration of downlink positioning reference signal symbols, N, that the UE can process in an indicated time period, T and N and T may be based, at least in part, on the UE assuming no bandwidth part switching or radio frequency retuning within a bandwidth part. In some instances, the one or more capabilities may include a tuning parameter. The tuning parameter may specify at least one of a bandwidth switching timing or a radio frequency switching timing and N and T may be modified, based at least in part, on the tuning parameter.

In some instances, the UE may receive, from the network and based on one or more capabilities the UE reported to the network, a reference signal configuration for the positioning procedure. The reference signal configuration may support coherent stitching (e.g., frequency hopping) with tone-overlap. In some instances, to support coherent stitching with tone-overlap, the reference signal configuration may include additional repetitions that enable mapping over a bandwidth. In some instances, to support coherent stitching with tone-overlap, the reference signal configuration may include a scaling factor. The scaling factor may be based, at least in part, on an actual bandwidth, a desired positioning measurement bandwidth, and an overlap indicated by the UE. In some instances, the reference signal configuration may include a number of resource blocks configured for positioning reference signal (PRS) transmission. In some instances, the reference signal configuration may include one or more of a number of overlapping physical resource blocks (PRBs), a percentage of overlapping PRBs, a change in a number of PRBs, and/or starting PRBs. In some instances, the reference signal configuration may include a measurement gap.

In some instances, to perform reference signal measurements based on the reference signal configuration, the UE may mute at least a portion of downlink position reference signal (PRS) resources. In some instances, muted downlink PRS resources may be indicated by a bitmap that may correspond to a configurable number of consecutive instances of a downlink PRS resource set. In some instances, all downlink PRS resources within the PRS resource set are muted for an instance indicated by the bitmap. In some instances, muted downlink PRS resources may be indicated by a bitmap where each bit in the bitmap may correspond to a single repetition index for each downlink PRS resource within each instance of a downlink PRS resource set. In some instances, individual hops of the downlink PRS resource set may be muted. In some instances, a length of the bitmap may correspond to a downlink PRS resource repetition factor. In some instances, a phase discontinuity may be generated by muting at least the portion of PRS resources. In such instances, transmission of the PRS resources may continue without regard to the phase discontinuity or transmission of the PRS resources may be shifted to account for the phase discontinuity such that a PRS transmission immediately after the muted portion of PRS resources may be shifted to remain in phase with a transmission that occurred immediately prior to the muted portion of the PRS resources.

In some instances, the UE may transmit a reference signal configuration for the positioning procedure. The reference signal configuration may support frequency hopping with tone-overlap. In some instances, the reference signal configuration may include an indication of a repetition factor. In some instances, the reference signal configuration may include an indication of a frequency hopping factor. The frequency hopping factor may indicate a number of overlapping resource blocks. In some instances, the frequency hopping factor may indicate a percentage of overlapping resource blocks.

In some instances, the reference signal configuration may include a plurality of reference signal configurations. In such instances, the UE may receive an indication of which reference signal configuration of the plurality of reference signal configurations to use for performing the reference signal measurements. The indication may be received via one of a downlink control information (DCI) message or a medium access control (MAC) control element (CE). In some instances, each reference signal configuration of the plurality of reference signal configurations may include a different periodicity.

Figure 13:
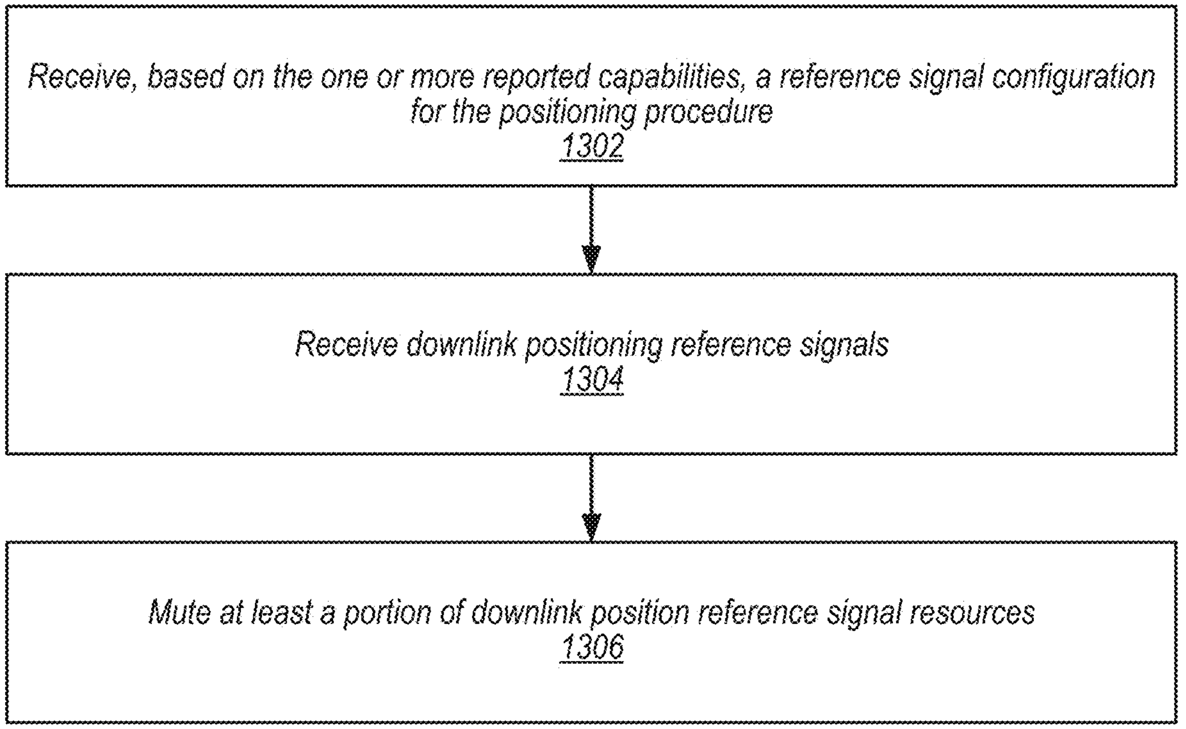
FIG. 13 illustrates a block diagram of an example of a method for muting PRS resources while performing location estimation for reduced capacity devices, according to some embodiments.

FIG. 13 illustrates a block diagram of an example of a method for muting PRS resources while performing location estimation for reduced capacity devices, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106 and/or UE 107, may receive, from a network (e.g., from a base station 102 and/or an LMF 609) a reference signal configuration for a positioning procedure, e.g., based on one or more capabilities reported by the UE. The reference signal configuration may support coherent stitching (e.g., frequency hopping) with tone-overlap. In some instances, to support coherent stitching with tone-overlap, the reference signal configuration may include additional repetitions that enable mapping over a bandwidth. In some instances, to support coherent stitching with tone-overlap, the reference signal configuration may include a scaling factor. The scaling factor may be based, at least in part, on an actual bandwidth, a desired positioning measurement bandwidth, and an overlap indicated by the UE. In some instances, the reference signal configuration may include a number of resource blocks configured for positioning reference signal (PRS) transmission. In some instances, the reference signal configuration may include one or more of a number of overlapping physical resource blocks (PRBs), a percentage of overlapping PRBs, a change in a number of PRBs, and/or starting PRBs. In some instances, the reference signal configuration may include a measurement gap.

At 1304, the UE may receive downlink positioning reference signals.

At 1306, the UE may mute at least a portion of downlink positioning reference signal resources. In some instances, muted downlink PRS resources may be indicated by a bitmap that may correspond to a configurable number of consecutive instances of a downlink PRS resource set. In some instances, all downlink PRS resources within the PRS resource set are muted for an instance indicated by the bitmap. In some instances, muted downlink PRS resources may be indicated by a bitmap where each bit in the bitmap may correspond to a single repetition index for each downlink PRS resource within each instance of a downlink PRS resource set. In some instances, individual hops of the downlink PRS resource set may be muted. In some instances, a length of the bitmap may correspond to a downlink PRS resource repetition factor. In some instances, a phase discontinuity may be generated by muting at least the portion of PRS resources. In such instances, transmission of the PRS resources may continue without regard to the phase discontinuity or transmission of the PRS resources may be shifted to account for the phase discontinuity such that a PRS transmission immediately after the muted portion of PRS resources may be shifted to remain in phase with a transmission that occurred immediately prior to the muted portion of the PRS resources.

In some instances, the UE may transmit a reference signal configuration for the positioning procedure. The reference signal configuration may support frequency hopping with tone-overlap. In some instances, the reference signal configuration may include an indication of a repetition factor. In some instances, the reference signal configuration may include an indication of a frequency hopping factor. The frequency hopping factor may indicate a number of overlapping resource blocks. In some instances, the frequency hopping factor may indicate a percentage of overlapping resource blocks.

In some instances, the reference signal configuration may include a plurality of reference signal configurations. In such instances, the UE may receive an indication of which reference signal configuration of the plurality of reference signal configurations to use for performing the reference signal measurements. The indication may be received via one of a downlink control information (DCI) message or a medium access control (MAC) control element (CE). In some instances, each reference signal configuration of the plurality of reference signal configurations may include a different periodicity.

In some instances, the UE may report to the network, one or more capabilities associated with a positioning procedure for location estimation. In some instances, the one or more capabilities may include a radio frequency retuning time. In some instances, the one or more capabilities may include a parameter indicating a number of bandwidth switches needed by the UE to cover an effective bandwidth and (at least in some instances) a duration of downlink positioning reference signal symbols, N, that the UE can process in an indicated time period, T. The number of bandwidth switches may be over an indicated bandwidth and the one or more capabilities may further include the indicated bandwidth. In some instances, the one or more capabilities may include a processing bandwidth. In some instances, the one or more capabilities may include a duration of downlink positioning reference signal symbols, N, that the UE can process in an indicated time period, T and N and T may be based, at least in part, on a number of bandwidth switches needed by the UE to cover an effective bandwidth. The number of bandwidth switches needed by the UE to cover an effective bandwidth may be negotiated between the UE and a base station. In some instances, the one or more capabilities may include a duration of downlink positioning reference signal symbols, N, that the UE can process in an indicated time period, T and N and T may be based, at least in part, on the UE assuming no bandwidth part switching or radio frequency retuning within a bandwidth part. In some instances, the one or more capabilities may include a tuning parameter. The tuning parameter may specify at least one of a bandwidth switching timing or a radio frequency switching timing and N and T may be modified, based at least in part, on the tuning parameter.

In some instances, the UE may perform reference signal measurements based on the reference signal configuration. In some instances, to perform the reference signal measurements based on the reference signal configuration, the UE may perform reference signal measurements on frequency hopping (FH) positioning reference signals (PRSs) dedicated to reduced capacity devices. In some instances, to perform reference signal measurements on FH PRSs, the UE may receive a first repetition of a FH PRS in a first frequency bandwidth that may be a subset of a full bandwidth used for full bandwidth PRSs, switch to a second frequency bandwidth that may be overlapped with the first frequency bandwidth and is a subset of the full bandwidth, and receive a second repetition of the FH PRS in the second frequency bandwidth. In some instances, at least the first repetition of the FH PRS may be a first repetition of a full bandwidth PRS.

Figure 14:
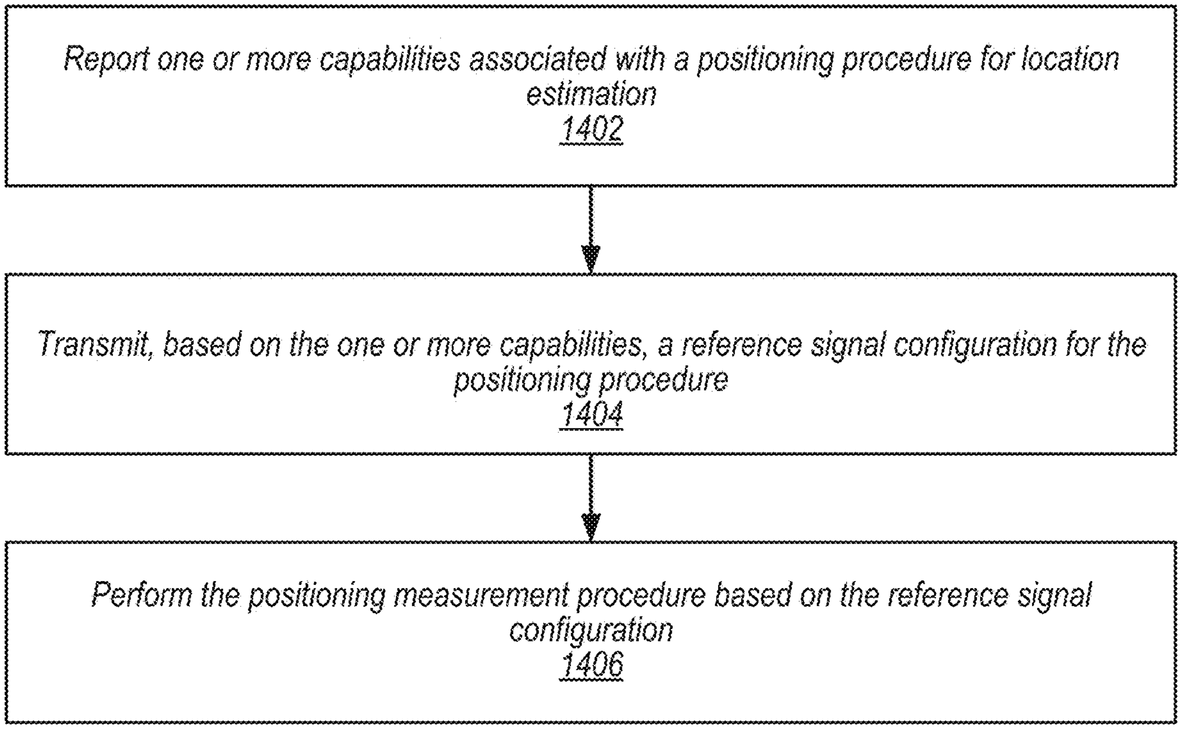
FIG. 14 illustrates a block diagram of an example of a method for transmitting a reference signal configuration for performing location estimation for reduced capacity devices, according to some embodiments.

FIG. 14 illustrates a block diagram of an example of a method for transmitting a reference signal configuration for performing location estimation for reduced capacity devices, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106 and/or UE 107, may report, to a network (e.g., to a base station, such as base station 102 or an LMF, such as LMF 609) one or more capabilities associated with a positioning procedure for location estimation. In some instances, the one or more capabilities may include a radio frequency retuning time. In some instances, the one or more capabilities may include a parameter indicating a number of bandwidth switches needed by the UE to cover an effective bandwidth and (at least in some instances) a duration of downlink positioning reference signal symbols, N, that the UE can process in an indicated time period, T. The number of bandwidth switches may be over an indicated bandwidth and the one or more capabilities may further include the indicated bandwidth. In some instances, the one or more capabilities may include a processing bandwidth. In some instances, the one or more capabilities may include a duration of downlink positioning reference signal symbols, N, that the UE can process in an indicated time period, T and N and T may be based, at least in part, on a number of bandwidth switches needed by the UE to cover an effective bandwidth. The number of bandwidth switches needed by the UE to cover an effective bandwidth may be negotiated between the UE and a base station. In some instances, the one or more capabilities may include a duration of downlink positioning reference signal symbols, N, that the UE can process in an indicated time period, T and N and T may be based, at least in part, on the UE assuming no bandwidth part switching or radio frequency retuning within a bandwidth part. In some instances, the one or more capabilities may include a tuning parameter. The tuning parameter may specify at least one of a bandwidth switching timing or a radio frequency switching timing and N and T may be modified, based at least in part, on the tuning parameter.

At 1404, the UE may transmit a reference signal configuration for the positioning procedure. The reference signal configuration may support frequency hopping with tone-overlap. In some instances, the reference signal configuration may include an indication of a repetition factor. In some instances, the reference signal configuration may include an indication of a frequency hopping factor. The frequency hopping factor may indicate a number of overlapping resource blocks. In some instances, the frequency hopping factor may indicate a percentage of overlapping resource blocks.

In some instances, the UE may receive, from the network and based on the one or more capabilities, a reference signal configuration for the positioning procedure. The reference signal configuration may support coherent stitching (e.g., frequency hopping) with tone-overlap. In some instances, to support coherent stitching with tone-overlap, the reference signal configuration may include additional repetitions that enable mapping over a bandwidth. In some instances, to support coherent stitching with tone-overlap, the reference signal configuration may include a scaling factor. The scaling factor may be based, at least in part, on an actual bandwidth, a desired positioning measurement bandwidth, and an overlap indicated by the UE. In some instances, the reference signal configuration may include a number of resource blocks configured for positioning reference signal (PRS) transmission. In some instances, the reference signal configuration may include one or more of a number of overlapping physical resource blocks (PRBs), a percentage of overlapping PRBs, a change in a number of PRBs, and/or starting PRBs. In some instances, the reference signal configuration may include a measurement gap.

At 1406, the UE may perform the positioning procedure, e.g., based on the reference signal configuration. In some instances, to perform the perform the positioning procedure, the UE may perform reference signal measurements on frequency hopping (FH) positioning reference signals (PRSs) dedicated to reduced capacity devices. In some instances, to perform reference signal measurements on FH PRSs, the UE may receive a first repetition of a FH PRS in a first frequency bandwidth that may be a subset of a full bandwidth used for full bandwidth PRSs, switch to a second frequency bandwidth that may be overlapped with the first frequency bandwidth and is a subset of the full bandwidth, and receive a second repetition of the FH PRS in the second frequency bandwidth. In some instances, at least the first repetition of the FH PRS may be a first repetition of a full bandwidth PRS.

In some instances, to perform the positioning procedure, the UE may mute at least a portion of downlink position reference signal (PRS) resources. In some instances, muted downlink PRS resources may be indicated by a bitmap that may correspond to a configurable number of consecutive instances of a downlink PRS resource set. In some instances, all downlink PRS resources within the PRS resource set are muted for an instance indicated by the bitmap. In some instances, muted downlink PRS resources may be indicated by a bitmap where each bit in the bitmap may correspond to a single repetition index for each downlink PRS resource within each instance of a downlink PRS resource set. In some instances, individual hops of the downlink PRS resource set may be muted. In some instances, a length of the bitmap may correspond to a downlink PRS resource repetition factor. In some instances, a phase discontinuity may be generated by muting at least the portion of PRS resources. In such instances, transmission of the PRS resources may continue without regard to the phase discontinuity or transmission of the PRS resources may be shifted to account for the phase discontinuity such that a PRS transmission immediately after the muted portion of PRS resources may be shifted to remain in phase with a transmission that occurred immediately prior to the muted portion of the PRS resources.

In some instances, to perform the positioning procedure, the UE may perform reference signal measurements on at least one non-positioning reference signal (PRS) reference signal. In some instances, the non-PRS reference signal may include at least one of a demodulation reference signal (DMRS), a channel-state information reference signal (CSI-RS), a tracking reference signal (TRS), and/or a secondary synchronization signal (SSS). In some instances, to perform the reference signal measurements on the at least one non-PRS reference signal, the UE may exchange, with a location management function (LFM), capability signaling indicate that the UE's position may be estimated using at least one non-PRS reference signal and receive, from the LMF, a configuration for the at least one non-PRS reference signal. In some instances, to perform the reference signal measurements on the at least one non-PRS reference signal, the UE may indicate, to an LMF, a reduction in accuracy requirements for UE positioning that may be base at least in part, on a mobility condition of the UE. The mobility condition of the UE may be substantially stationary since a prior positioning measurement. In some instances, to perform the reference signal measurements on the at least one non-PRS reference signal, the UE may indicate, to an LMF, a maintenance mode for UE positioning determination capability. In such instances, usage of the at least one non-PRS reference signal may be based on the UE supporting the maintenance mode for UE positioning determination.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more customdesigned hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing location estimation using frequency hopping (FH) positioning reference signals (PRSs), comprising:

a user equipment device (UE), receiving, from a network, a first repetition of a FH PRS in a first frequency bandwidth, wherein the first repetition of the FH PRS is a full bandwidth PRS;

switching to a second frequency bandwidth;

receiving, from the network, a second repetition of the FH PRS in the second frequency bandwidth, wherein the first repetition of the FH PRS and the second repetition of the FH PRS are adjacent in frequency and are configured with tone overlap to support coherent stitching across frequency bands; and receiving, from the network, an indication of a position of the UE.

2. The method of claim 1, wherein the second frequency bandwidth is at least partially overlapped with the first frequency bandwidth.

3. The method of claim 1, wherein the second frequency bandwidth is a subset of a full bandwidth used for a full bandwidth PRS.

4. The method of claim 1, wherein the UE comprises a reduced capacity UE.

5. The method of claim 1, further comprising:

the UE, reporting, to the network, measurements of at least the first repetition of the FH PRS and the second repetition of the FH PRS.

6. A user equipment device (UE), comprising:

at least one antenna;

at least one radio in communication with the at least one antenna and configured to communicate according to at least one radio access technology (RAT); and one or more processors in communication with the at least one radio and configured to cause the UE to:

receive, from a network, a first repetition of a frequency hopping (FH) positioning reference signal (PRS) in a first frequency bandwidth, wherein the first repetition of the FH PRS is a full bandwidth PRS;

switch to a second frequency bandwidth;

receive, from the network, a second repetition of the FH PRS in the second frequency bandwidth, wherein the first repetition of the FH PRS and the second repetition of the FH PRS are adjacent in frequency and are configured with tone overlap to support coherent stitching across frequency bands; and receive, from the network, an indication of a position of the UE.

7. The UE of claim 6, wherein the second frequency bandwidth is at least partially overlapped with the first frequency bandwidth.

8. The UE of claim 6, wherein the second frequency bandwidth is a subset of a full bandwidth used for a full bandwidth PRS.

9. The UE of claim 6, wherein the UE comprises a reduced capacity UE.

10. The UE of claim 6, wherein the one or more processors are further configured to cause the UE to:

report, to the network, one or more capabilities associated with a positioning procedure for location estimation.

11. The UE of claim 6, wherein the one or more processors are further configured to cause the UE to:

report, to the network, measurements of at least the first repetition of the FH PRS and the second repetition of the FH PRS.

12. An apparatus, comprising:

a memory; and at least one processor in communication with the memory and configured to:

receive, from a network, a first repetition of a frequency hopping (FH) positioning reference signal (PRS) in a first frequency bandwidth, wherein the first repetition of the FH PRS is a full bandwidth PRS;

switch to a second frequency bandwidth;

receive, from the network, a second repetition of the FH PRS in the second frequency bandwidth, wherein the first repetition of the FH PRS and the second repetition of the FH PRS are adjacent in frequency and are configured with tone overlap to support coherent stitching across frequency bands; and receive, from the network, an indication of a position of the apparatus.

13. The apparatus of claim 12, wherein the second frequency bandwidth is at least partially overlapped with the first frequency bandwidth.

14. The apparatus of claim 12, wherein the second frequency bandwidth is a subset of a full bandwidth used for a full bandwidth PRS.

15. The apparatus of claim 12, wherein the at least one processor is further configured to:

report, to the network, measurements of at least the first repetition of the FH PRS and the second repetition of the FH PRS.

16. The apparatus of claim 12, wherein the apparatus is comprised in a reduced capacity user equipment device (UE).

17. The apparatus of claim 12, wherein the at least one processor is further configured to: report, to the network, one or more capabilities associated with a positioning procedure for location estimation.

18. The apparatus of claim 17 wherein the one or more capabilities include a radio frequency retuning time.

19. The method of claim 1, further comprising:

the UE, reporting, to the network, one or more capabilities associated with a positioning procedure for location estimation.

20. The method of claim 19, wherein the one or more capabilities include a radio frequency retuning time.

21. The method of claim 15, further comprising:

maintaining phase continuity of the positioning reference signals across frequency-hopped repetitions during one or more muting intervals.

22. The method of claim 1, wherein receiving the reference signal configuration from the network comprises receiving a configuration that is selected based on one or more capabilities reported by the UE.

23. The UE of claim 10, wherein the one or more capabilities include a radio frequency retuning time.

* * * * *